(12) United States Patent
Sato et al.

(10) Patent No.: US 11,704,522 B2
(45) Date of Patent: Jul. 18, 2023

(54) INFORMATION PROCESSING DEVICE AND INFORMATION PROCESSING METHOD

(71) Applicant: SEIKO EPSON CORPORATION, Tokyo (JP)

(72) Inventors: Katsuaki Sato, Matsumoto (JP); Kazunaga Suzuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 17/036,118

(22) Filed: Sep. 29, 2020

(65) Prior Publication Data

US 2021/0097360 A1 Apr. 1, 2021

(30) Foreign Application Priority Data

Oct. 1, 2019 (JP) .................. 2019-181149

(51) Int. Cl.
| | |
|---|---|
| *G06K 15/00* | (2006.01) |
| *G06K 15/10* | (2006.01) |
| *B41J 2/045* | (2006.01) |
| *B41J 11/00* | (2006.01) |
| *B41J 2/165* | (2006.01) |

(52) U.S. Cl.
CPC ........ *G06K 15/408* (2013.01); *B41J 2/04536* (2013.01); *B41J 2/04563* (2013.01); *B41J 2/04566* (2013.01); *B41J 2/04586* (2013.01); *B41J 2/16535* (2013.01); *B41J 2/16579* (2013.01); *B41J 11/0024* (2021.01); *G06K 15/102* (2013.01); *B41J 2002/16573* (2013.01)

(58) Field of Classification Search
CPC . G06K 15/408; G06K 15/102; B41J 2/04536; B41J 2/04563; B41J 2/04566; B41J 2/04586; B41J 2/16535; B41J 2/16579; B41J 11/0024; B41J 2002/16573; B41J 2/04508; B41J 2/04553; B41J 2/16517; B41J 2/04581; B41J 2/01; B41J 2/14201; B41J 29/393; G06N 3/0481; G06N 3/084; G06N 20/00

USPC .......................................... 347/189
See application file for complete search history.

(56) References Cited

U.S. PATENT DOCUMENTS

| | | | |
|---|---|---|---|
| 2001/0012031 A1* | 8/2001 | Miyake .................. | B41J 2/2139 347/40 |
| 2007/0285456 A1* | 12/2007 | Takasu ................. | B41J 2/04588 347/19 |
| 2016/0101622 A1* | 4/2016 | Sakata ..................... | B41J 2/155 347/25 |
| 2016/0368271 A1* | 12/2016 | Horrocks ............. | B41J 11/0085 |

FOREIGN PATENT DOCUMENTS

JP 2015-131419 7/2015

* cited by examiner

*Primary Examiner* — Matthew Luu
*Assistant Examiner* — Alexander D Shenderov
(74) *Attorney, Agent, or Firm* — Workman Nydegger

(57) ABSTRACT

An information processing device includes a storage portion storing a learned model trained by machine learning based on a data set in which temperature information, setting information, and countermeasure information are associated, a reception portion receiving the temperature information and the setting information at a time of ejecting ink by the printing head, and a processing portion deciding a countermeasure to be executed for condensation based on the received temperature information and setting information and the learned model.

11 Claims, 15 Drawing Sheets

INFORMATION PROCESSING DEVICE AND INFORMATION PROCESSING METHOD

The present application is based on, and claims priority from JP Application Serial Number 2019-181149, filed Oct. 1, 2019, the disclosure of which is hereby incorporated by reference herein in its entirety.

BACKGROUND

1. Technical Field

The present disclosure relates to an information processing device, a learning device, and an information processing method.

2. Related Art

The effect of an ambient temperature and an ambient humidity may cause condensation on the surface of a nozzle plate of a printing head mounted in a printing apparatus. For example, JP-A-2015-131419 discloses that a difference in temperature with a head due to an increase in temperature in a printing region causes condensation on a nozzle surface. JP-A-2015-131419 discloses a method of predicting a condensation amount from an ink consumption amount and a method of detecting the condensation amount using an optical module. However, various elements other than the ink consumption amount are also related to an occurring situation of condensation. Thus, it is difficult to make predictions with sufficient accuracy by using the methods in JP-A-2015-131419. When a dedicated detection portion such as the optical module is disposed, the number of components is increased. There is no disclosure related to machine learning in the methods in the related art such as JP-A-2015-131419.

SUMMARY

According to an aspect of the present disclosure, there is provided an information processing device including a storage portion storing a learned model trained by machine learning based on a data set in which temperature information about at least one of a usage environment of a printing apparatus including a printing head and a nozzle plate of the printing head, setting information at a time of ejecting ink to a printing medium by the printing head, and countermeasure information indicating a countermeasure for condensation occurring in the nozzle plate are associated, a reception portion receiving the temperature information and the setting information at the time of ejecting the ink by the printing head, and a processing portion deciding the countermeasure to be executed for the condensation based on the received temperature information and setting information and the learned model.

DESCRIPTION OF EXEMPLARY EMBODIMENTS

Hereinafter, the present embodiment will be described. The present embodiment described below does not unduly limit a content disclosed in the claims. Not all configurations described in the present embodiment are essential constituents.

1. Overview 1.1 Configuration Example of Printing Apparatus

Figure 1:
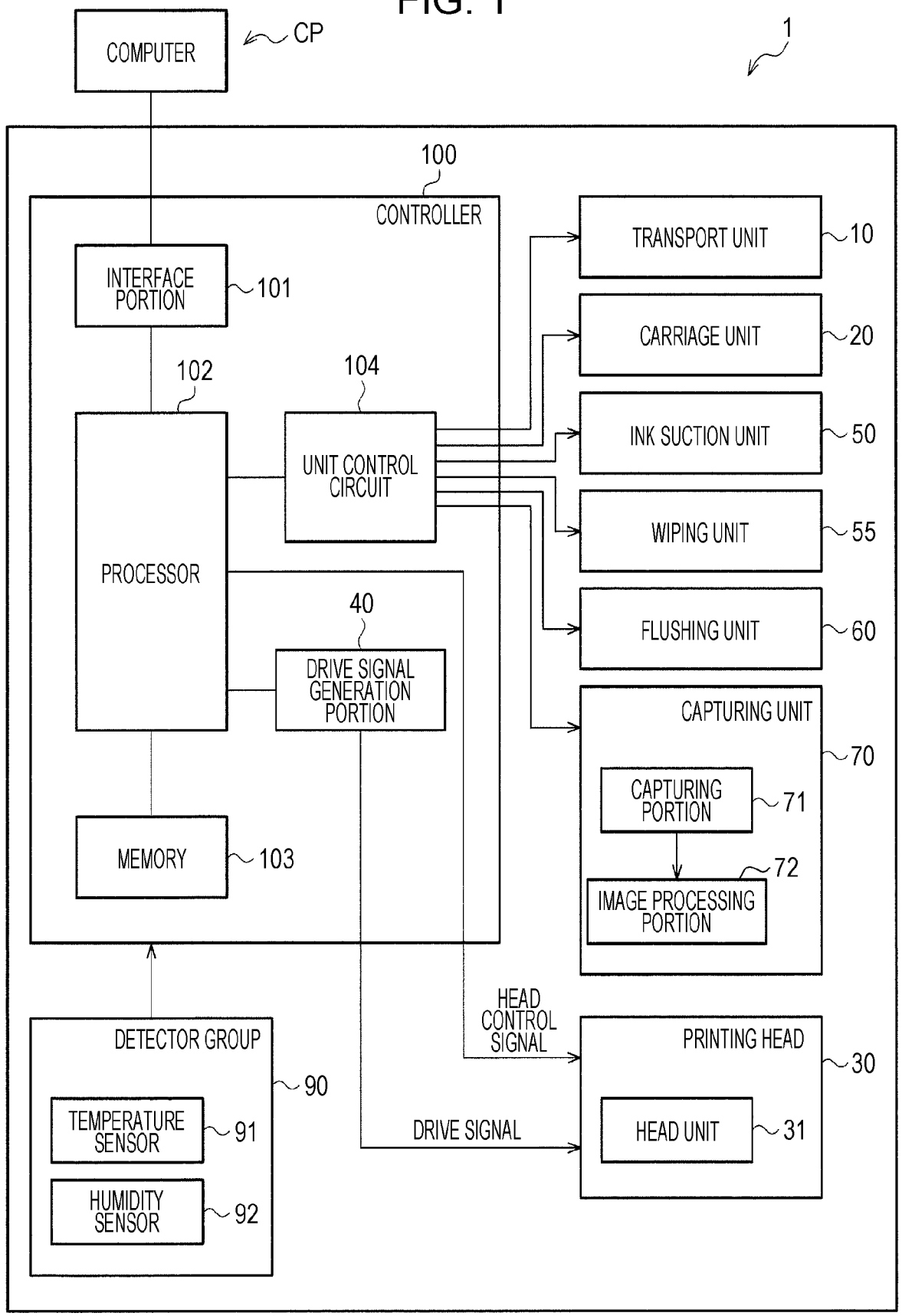
FIG. 1 is a configuration example of a printing apparatus.

FIG. 1 is a diagram illustrating a configuration of a printing apparatus 1 according to the present embodiment. As illustrated in FIG. 1, the printing apparatus 1 includes a transport unit 10, a carriage unit 20, a printing head 30, a drive signal generation portion 40, an ink suction unit 50, a wiping unit 55, a flushing unit 60, a capturing unit 70, a detector group 90, and a controller 100. The printing apparatus 1 ejects ink toward a printing medium and is communicably connected to a computer CP. In order to cause the printing apparatus 1 to print an image, the computer CP transmits printing data corresponding to the image to the printing apparatus 1.

Figure 2:
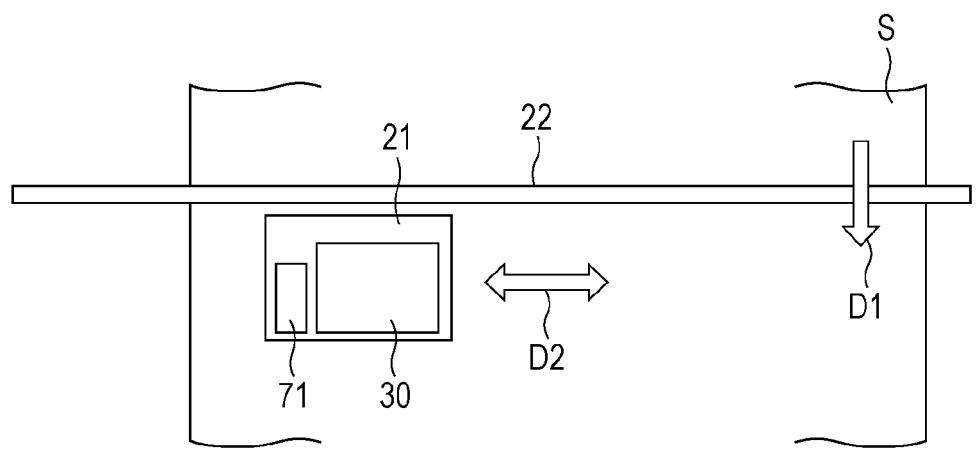
FIG. 2 is a diagram illustrating a configuration around a printing head.

FIG. 2 is a diagram for describing a configuration around the printing head 30. The printing medium is transported in a predetermined direction by the transport unit 10. For example, the printing medium is a paper sheet S. The paper sheet S may be a printing paper sheet having a predetermined size or continuous paper. The printing medium is not limited to paper, and various media such as cloth, a film, and polyvinyl chloride (PVC) can be used. Hereinafter, the direction in which the printing medium is transported will be referred to as the transport direction. The transport direction corresponds to D1 in FIG. 2. The transport unit 10 includes a transport roller, a transport motor, and the like not illustrated. The transport motor rotates the transport roller. By rotating the transport roller, the printing medium that is fed is transported to a printing area that is a region in which printing processing can be executed. The printing area is a region that can face the printing head 30.

The printing head 30 is mounted in the carriage unit 20. The carriage unit 20 includes a carriage 21 and a carriage motor not illustrated. The carriage 21 is supported in a reciprocable manner in a paper width direction of the paper sheet S along a guide rail 22. The carriage motor is driven based on a carriage control signal from a processor 102. By driving the carriage motor, the carriage 21 is moved together with the printing head 30 as a single unit. The printing apparatus 1 of the present embodiment is, for example, a printing apparatus of a serial head type as illustrated in FIG. 2. The serial head type is a type that performs printing in a paper width by causing the printing head 30 to reciprocate in the paper width direction. The paper width direction may be referred to as the main scanning direction. The paper width direction or the main scanning direction corresponds to D2 in FIG. 2.

The printing head 30 includes a plurality of head units 31. Each head unit 31 includes, for example, a plurality of nozzles Nz arranged in the transport direction and a head control portion not illustrated. Hereinafter, the plurality of nozzles Nz arranged in a predetermined direction will be referred to as the nozzle array.

The drive signal generation portion 40 generates a drive signal. When the drive signal is applied to a piezo element PZT that is a drive element, the piezo element PZT expands and contracts, and ink is ejected from each nozzle Nz. Details of the head unit 31 including the piezo element PZT will be described later using FIG. 3. The head control portion performs a control for ejecting ink to the printing medium from the nozzle Nz based on a head control signal from the processor 102 and the drive signal from the drive signal generation portion 40. Accordingly, an image is formed on the printing medium.

The ink suction unit 50 sucks and discharges ink in the head to the outside of the head from the nozzle Nz of the printing head 30. The ink suction unit 50 sucks ink in the printing head 30 together with air bubbles mixed in the printing head 30 by operating a suction pump, not illustrated, to form a negative pressure in a space of a cap in a state where the cap, not illustrated, is brought into close contact with a nozzle surface of the printing head 30. Accordingly, it is possible to recover from an ejection failure of the nozzle Nz.

The wiping unit 55 removes a liquid droplet clinging to a nozzle plate NP of the printing head 30. The wiping unit 55 includes a wiper that can abut on the nozzle plate NP of the printing head 30. The wiper is an elastic member having flexibility. When the carriage 21 is moved in the paper width direction by driving the carriage motor, a tip end portion of the wiper is bent by abutting on the nozzle plate NP of the printing head 30. Accordingly, the wiping unit 55 removes a liquid droplet clinging to the nozzle plate NP. Alternatively, the wiping unit 55 may include a wiping member such as cloth and a first winding shaft and a second winding shaft around which the wiping member is wound. The wiping member wound around the first winding shaft is fed to the second winding shaft by a given feeding unit. The liquid droplet clinging to the nozzle plate NP is removed by pressing the wiping member to the nozzle plate NP on a path of feeding. Wiping of the wiping unit 55 can suppress occurrence of curved flight caused by condensation. The wiping unit 55 may be used for removing a foreign object such as paper dust clinging to the nozzle plate NP. In this case, ink can be normally ejected from the nozzle Nz that is clogged with the foreign object.

The flushing unit 60 receives and retains ink ejected by a flushing operation performed by the printing head 30. The flushing operation is an operation of applying a drive signal not related to the image to be printed to the drive element and forcibly ejecting ink droplets continuously from the nozzle Nz. Accordingly, a situation in which an appropriate amount of ink is not ejected due to thickening and drying of ink in the head can be suppressed. Thus, it is possible to recover from the ejection failure of the nozzle Nz.

The capturing unit 70 examines the ejection failure based on the state of the printed image formed on the paper sheet S. The capturing unit 70 includes a capturing portion 71 and an image processing portion 72. For example, the capturing unit 70 acquires ejection result image information by capturing a result of ejecting ink to the printing medium. The image processing portion 72 and the controller 100 are individually illustrated in FIG. 1. However, the image processing portion 72 may be implemented by the controller 100. The capturing unit 70 is mounted in, for example, the carriage 21 as illustrated in FIG. 2. By doing so, even when an angle of view of the capturing portion 71 is narrower than the paper width, a wide range of a printing result can be efficiently captured.

The controller 100 is a control unit for controlling the printing apparatus 1. The controller 100 includes an interface portion 101, the processor 102, a memory 103, and a unit control circuit 104. The interface portion 101 transmits and receives data between the printing apparatus 1 and the computer CP that is an external apparatus. The processor 102 is a calculation processing device for controlling the entire printing apparatus 1. For example, the processor 102 is a central processing unit (CPU). The memory 103 is used for securing a region for storing a program of the processor 102, a work region, and the like. The processor 102 controls each unit in accordance with the program stored in the memory 103 using the unit control circuit 104.

The detector group 90 monitors an operation situation of the printing apparatus 1 and includes, for example, a temperature sensor 91 and a humidity sensor 92. The detector group 90 may include sensors, not illustrated, such as an air pressure sensor, an altitude sensor, an air bubble sensor, a dust sensor, and a crease sensor. In addition, the detector group 90 may include configurations such as a rotary encoder used for controlling transport and the like of the printing medium, a paper sheet detection sensor detecting whether or not the transported printing medium is present, and a linear encoder for detecting a position in a movement direction of the carriage 21.

The printing apparatus 1 of the serial head type is described above. Alternatively, the printing apparatus 1 of the present embodiment may be a printing apparatus of a line head type in which the printing head 30 is disposed to cover the width of the paper sheet.

1.2 Configuration Example of Printing Head

Figure 3:
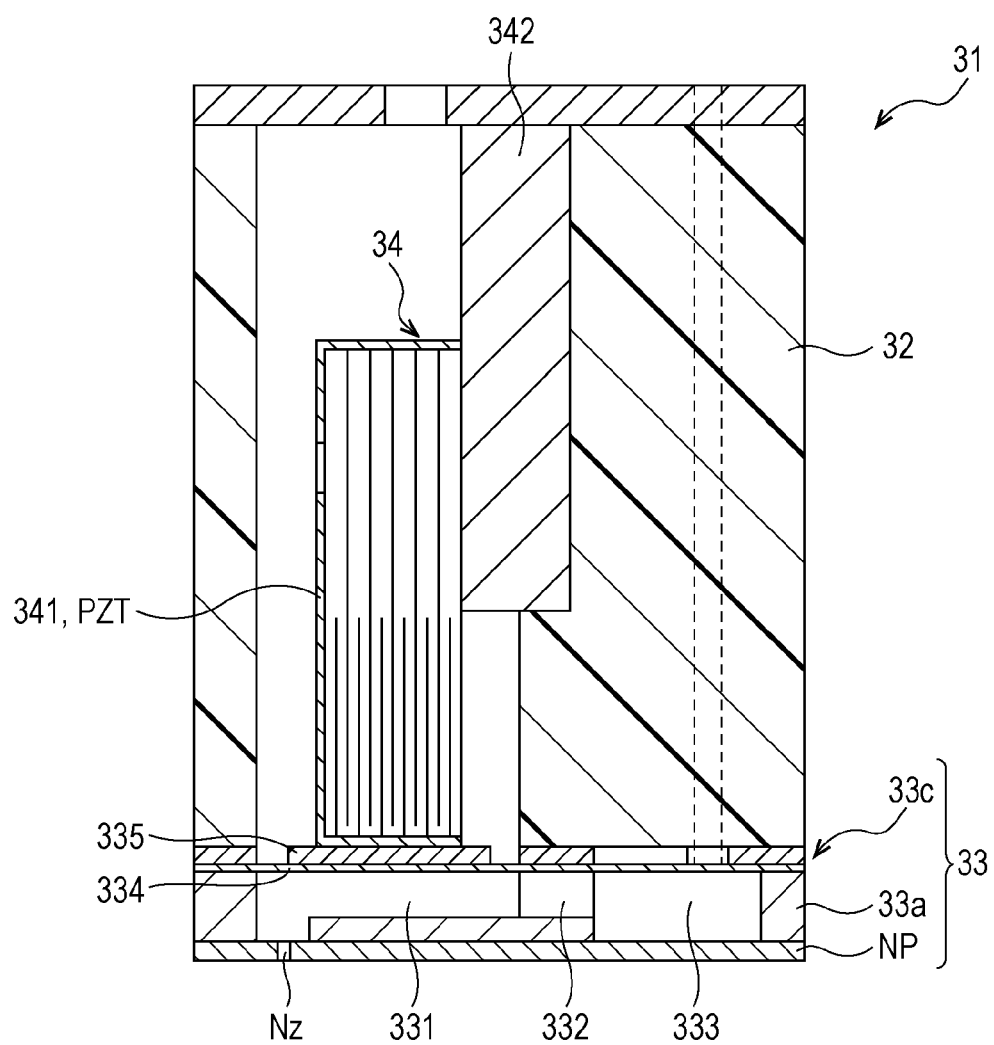
FIG. 3 is a sectional view illustrating a configuration of a head unit.

FIG. 3 is a sectional view for describing a configuration of the head unit 31 included in the printing head 30. The head unit 31 includes a case 32, a flow passage unit 33, and a piezo element unit 34. In FIG. 3, wiring and the like for driving the piezo element PZT are not illustrated.

The case 32 is a member for fixing the piezo element PZT or the like by accommodating the piezo element PZT and is formed of a non-conductive resin material such as epoxy resin.

The flow passage unit 33 includes a flow passage forming substrate 33a, the nozzle plate NP, and a vibration plate 33c. The nozzle plate NP is joined to one surface of the flow passage forming substrate 33a, and the vibration plate 33c is joined to the other surface of the flow passage forming substrate 33a. A pressure chamber 331, an ink supply passage 332, and a void portion or a groove as a common ink chamber 333 are formed in the flow passage forming substrate 33a. The flow passage forming substrate 33a is formed with, for example, a silicon substrate. One or a plurality of nozzle arrays including the plurality of nozzles Nz are disposed in the nozzle plate NP. The nozzle plate NP is formed with a conductive plate-shaped member such as a thin metal plate. A diaphragm portion 334 is disposed in a part of the vibration plate 33c corresponding to each pressure chamber 331. The diaphragm portion 334 is deformed by the piezo element PZT and changes the capacity of the pressure chamber 331. The vibration plate 33c and an adhesive layer or the like are interposed between the piezo element PZT and the nozzle plate NP. Thus, the piezo element PZT and the nozzle plate NP are in an electrically insulated state.

The piezo element unit 34 includes a piezo element group 341 and a fixing member 342. The piezo element group 341 has a comb teeth shape. Each comb tooth is the piezo element PZT. A tip end surface of each piezo element PZT is bonded to an island portion 335 included in the corresponding diaphragm portion 334. The fixing member 342 supports the piezo element group 341 and is a portion for attachment to the case 32. The piezo element PZT is one example of an electromechanical conversion element. When a drive signal is applied, the piezo element PZT changes the pressure of liquid in the pressure chamber 331 by expanding and contracting in a longitudinal direction. The pressure of ink in the pressure chamber 331 is changed due to a change in capacity of the pressure chamber 331. By using this change in pressure, an ink droplet can be ejected from the nozzle Nz. A structure of ejecting an ink droplet by generating air bubbles corresponding to the applied drive signal may be used instead of the piezo element PZT as the electromechanical conversion element.

Figure 4:
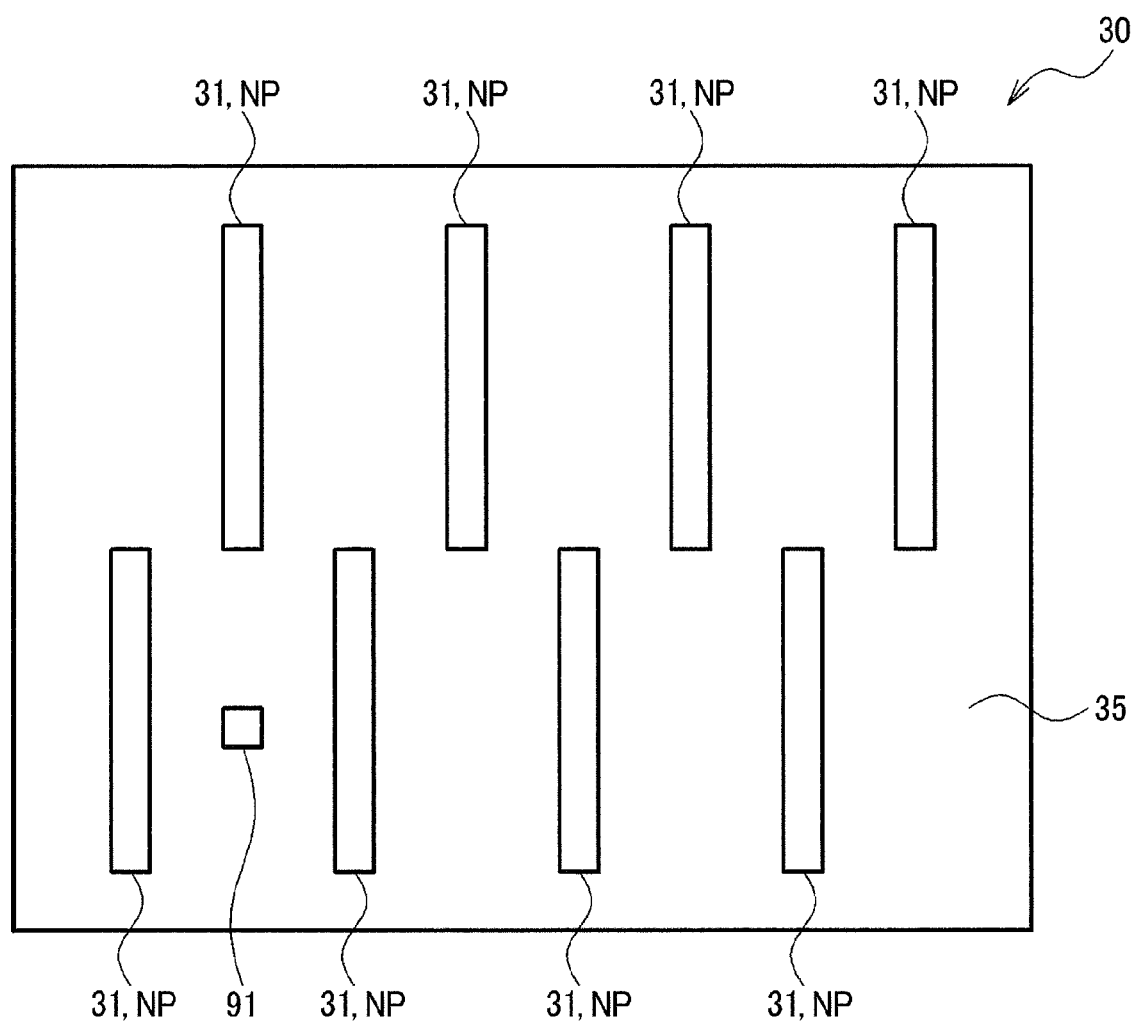
FIG. 4 is a diagram for describing an arrangement example of the head unit in the printing head.

FIG. 4 is a diagram illustrating a configuration of a surface on a side of the printing head 30 from which ink is ejected. As illustrated in FIG. 4, the printing head 30 includes a fixing plate 35 and the plurality of head units 31 fixed to the fixing plate 35. As illustrated in FIG. 3, the nozzle plate NP of the head unit 31 is exposed on the surface from which ink is ejected. The temperature sensor 91 may be disposed in, for example, the printing head 30 as illustrated in FIG. 4. In the example in FIG. 4, the temperature sensor 91 is arranged in the fixing plate 35.

One head unit 31 includes one nozzle array that is disposed in, for example, the transport direction. The printing head 30 illustrated in FIG. 4 includes eight head units 31. Thus, the printing head 30 includes, for example, two black ink nozzle arrays, two cyan ink nozzle arrays, two magenta ink nozzle arrays, and two yellow ink nozzle arrays in a lower surface thereof. The printing head 30 ejects ink of a corresponding color toward the paper sheet S from each nozzle array. Alternatively, one head unit 31 may include two or more nozzle arrays. The number of head units included in the printing head 30 is not limited to eight, and various modifications can be made. The printing head 30 according to the present embodiment may include nozzle arrays of a specific ink color.

An example of disposing one printing head 30 in the carriage 21 is described using FIG. 2. Alternatively, two or more printing heads 30 may be disposed in the carriage 21. For example, an area in which printing can be performed while the carriage 21 reciprocates once can be increased by arranging a plurality of printing heads 30 at different positions in the transport direction. Besides, various configurations are known for the printing head 30 and the head unit 31 and can be widely applied in the present embodiment.

1.3 Condensation

It is known that condensation occurs in the printing apparatus 1. Condensation here means that a liquid droplet clings to a surface of the nozzle plate NP on a printing medium side. For example, when the temperature of the nozzle plate NP is relatively decreased with respect to an ambient temperature, condensation occurs due to a difference in temperature. When a position to which the liquid droplet clings is close to the nozzle Nz, an ejection failure such as curved flight may occur due to condensation.

Figure 5:
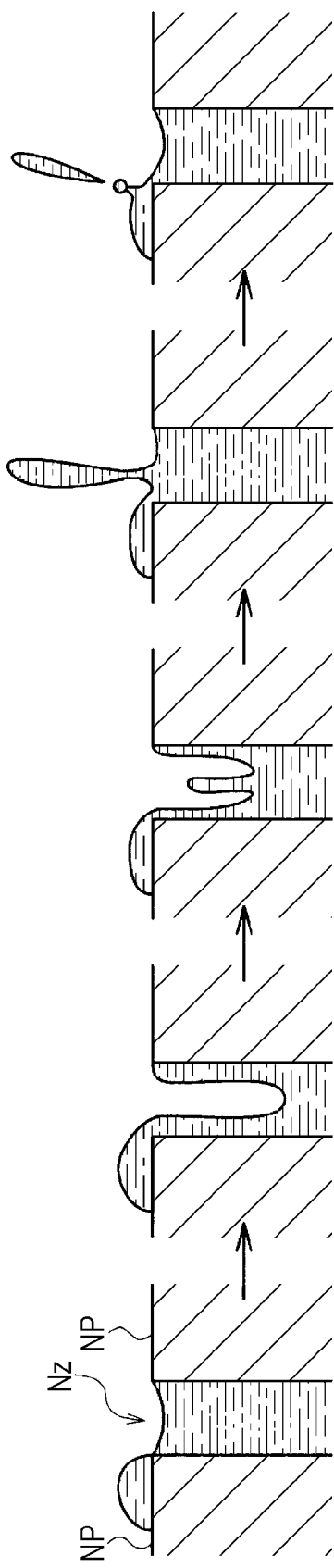
FIGS. 5A to 5E are diagrams for describing curved flight caused by condensation.

FIGS. 5A to 5E are diagrams for describing curved flight caused by condensation. In FIGS. 5A to 5E, an upward direction is an ejection direction of ink. FIG. 5A is a state before ink ejection where a liquid droplet is clinging in the vicinity of the nozzle Nz. As illustrated in FIG. 5B, a liquid surface of ink is drawn in a direction opposite to the ejection direction by driving the piezo element PZT. Hereinafter, the shape of the liquid surface will be referred to as the meniscus. Then, as illustrated in FIG. 5C and FIG. 5D, ink is ejected, and the meniscus is about to return to an original state. When the liquid droplet is present in the vicinity of the nozzle Nz, ink is drawn to a liquid droplet side when the meniscus and the ejected ink are separated as illustrated in FIG. 5E. Consequently, a part of the ejected ink has a curved ejection direction and lands at a position shifted to the liquid droplet side compared to an original landing position.

As illustrated in FIGS. 5A to 5E, condensation decreases printing quality. A control for removing the liquid droplet clinging to the nozzle plate NP by periodically performing wiping by the wiping unit 55 is performed in the related art. However, when an interval at which wiping is performed is long, a likelihood of occurrence of condensation between a given wiping execution timing and a subsequent execution timing is increased. Meanwhile, when the interval at which wiping is performed is short, unnecessary wiping may be executed.

From the above consideration, a factor related to occurrence of condensation is considered, and then, estimation of an occurring situation of condensation or decision of a countermeasure for condensation, or both thereof are performed in the present embodiment. Information related to occurrence of condensation will be examined using FIG. 6.

Figure 6:
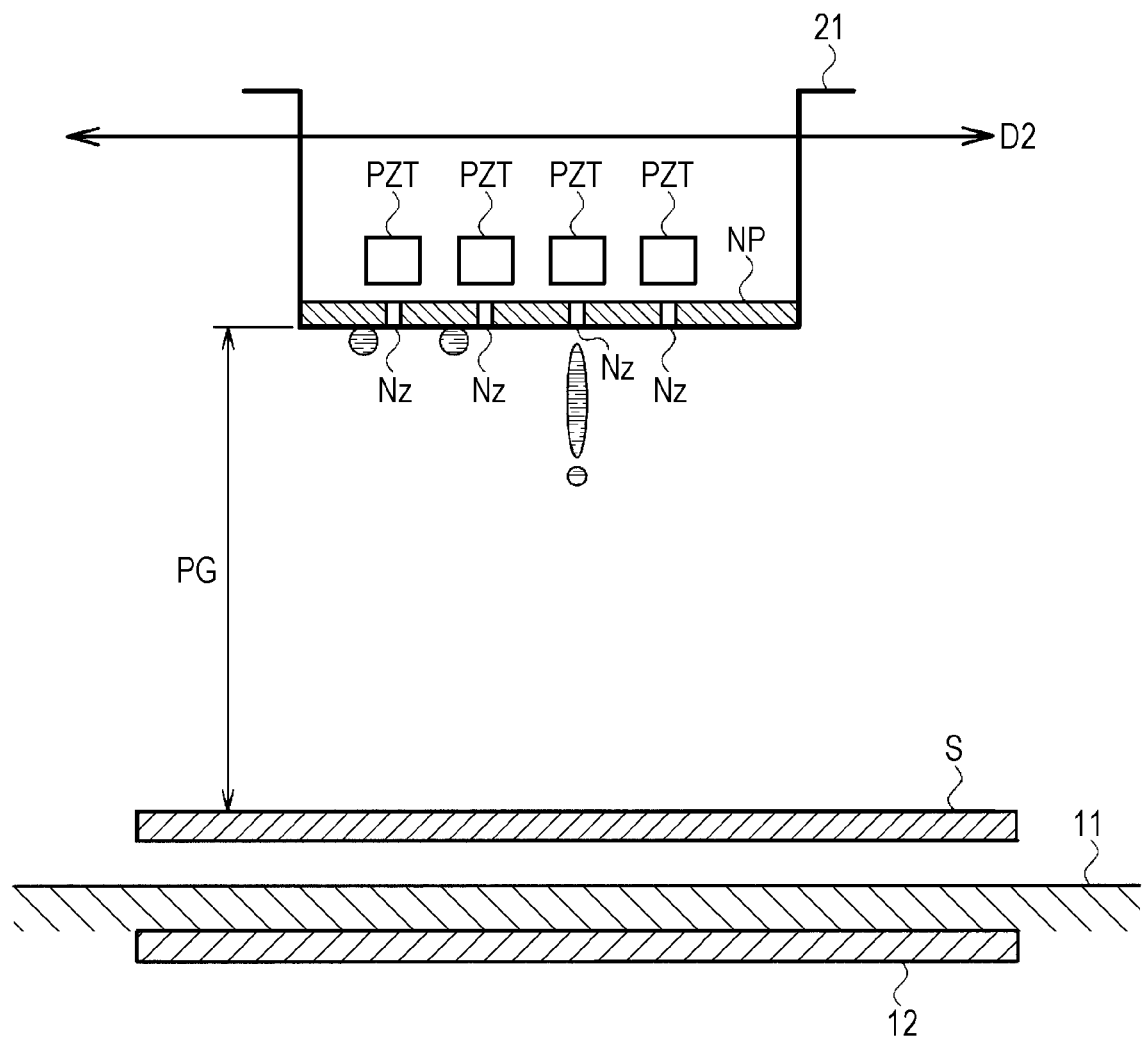
FIG. 6 is a diagram for describing a cause of condensation.

FIG. 6 is a sectional view of the printing head 30 and the printing medium observed from a horizontal direction. In FIG. 6, structures such as the printing head 30 are illustrated in a simplified manner. As described above, the printing head 30 reciprocates in the paper width direction in accordance with driving of the carriage 21. The printing head 30 includes the plurality of nozzles Nz, and ink droplets are ejected toward the printing medium from the nozzles. The printing medium is transported onto a platen 11 by the transport unit 10. Hereinafter, a distance between the nozzle plate NP and the printing medium will be referred to as a print gap PG.

As described above, clinging of the liquid droplet to the nozzle plate NP is caused by occurrence of the difference in temperature due to a relative decrease in temperature of the nozzle plate NP. Thus, temperature information indicating the temperature of the nozzle plate NP can be used as information related to occurrence of condensation.

In the printing head 30, a large heat source other than the piezo element PZT is not present, and the amount of heat generated by the piezo element PZT is not large enough to significantly change the temperature of the nozzle plate NP with respect to an atmospheric temperature. That is, temperature information indicating the temperature of a usage environment can be used as information related to occurrence of condensation instead of the temperature information indicating the temperature of the nozzle plate NP.

However, considering a heat source such as a heater 12 described later, it is considered that the temperature of the nozzle plate NP does not match the temperature of the usage environment. Thus, both of the temperature of the nozzle plate NP and the temperature of the usage environment may be used as information related to occurrence of condensation in the present embodiment. In this case, not only the temperature of the nozzle plate NP itself but also the temperature around the nozzle plate NP are acquired. Thus, processing considering a tendency or the like of a change in temperature of the nozzle plate NP can also be performed.

The heater 12 may be disposed in the platen 11 as illustrated in FIG. 6. A quick-drying property of ink can be improved using the heater 12. In addition, by heating, ink easily penetrates into the printing medium. The heater 12 may include a first heater disposed upstream of the printing area and a second heater disposed at a position corresponding to the printing area or downstream of the position. The first heater is used for preheating the printing medium before ink ejection. The second heater is used for heating the ejected ink. By doing so, the quick-drying property and penetrability of ink can be efficiently improved even when the size of each heater is small. The number of heaters 12 may be one, or the heater 12 may have a shape capable of heating a wide area. Various modifications can be made to a specific configuration.

When the heater 12 is used, the difference in temperature with the nozzle plate NP easily occurs due to an increase in temperature around the heater 12. Thus, temperature information about the heater 12 can be used as information related to occurrence of condensation.

It is known that the amount of water vapor included in a space as a target or a humidity significantly affects occurrence of condensation. When the humidity is high, water vapor included in the space or evaporated ink turns into liquid and easily clings to the nozzle plate NP. For condensation in the printing apparatus 1, the space as a target is a space between the printing head 30 and the printing medium as illustrated in FIG. 6. When air in the space is efficiently circulating, an increase in humidity compared to a humidity in an ambient atmosphere is suppressed. Thus, occurrence of condensation is also suppressed. Conversely, when air does not circulate, the humidity is increased, and condensation easily occurs. That is, a wind speed at which air between the printing head 30 and the printing medium circulates is related to occurrence of condensation. When the printing apparatus 1 is of the serial head type as described using FIG. 2, a movement speed of the carriage 21 can be considered as the wind speed. That is, movement speed information about the carriage 21 can be used as information related to occurrence of condensation.

Considering that the difference in temperature is important, occurrence of condensation is suppressed when the difference in temperature with the nozzle plate NP is decreased by causing the heat generated in the heater 12 to propagate around the heater 12. That is, as the print gap PG which is the distance between the nozzle plate NP and the printing medium is small, the difference in temperature is easily reduced. It is also considered that air in a lower space of the printing head 30 does not easily circulate by decreasing the print gap PG. That is, decreasing the print gap PG may contribute in both of a direction of suppressing occurrence of condensation and a direction of promoting occurrence of condensation. Which of the contributions is high depends on situations. Either way, the print gap PG is information related to occurrence of condensation. In the present embodiment described below, a degree of contribution to easy elimination of the difference in temperature is relatively high, and condensation is suppressed by decreasing the print gap PG.

Heater temperature information indicating the temperature of the heater 12, the movement speed information about the carriage 21, and the print gap PG described above are parameters for setting an operation at the time of printing. Thus, hereinafter, the parameters will be referred to as the setting information. The temperature of the heater 12 and the movement speed of the carriage 21 can be adjusted using control information about the heater 12 and the carriage motor. The print gap PG may be automatically changed by the printing apparatus 1 or may be manually changed by a user. The print gap PG is also changed depending on the thickness of the printing medium. For example, even when the position of the platen 11 is fixed, the print gap PG is increased when a thin printing medium such as paper is used, and the print gap PG is decreased when a thick printing medium such as cloth or PVC is used.

2. Learning Processing 2.1 Configuration Example of Learning Device

Figure 7:
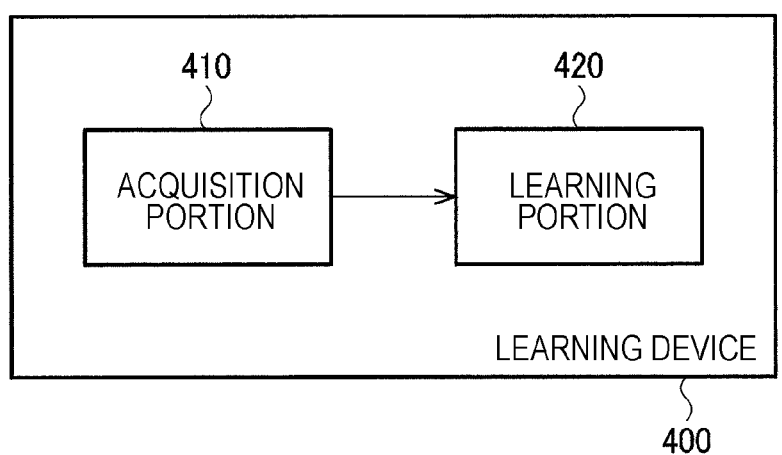
FIG. 7 is a configuration example of a learning device.

FIG. 7 is a diagram illustrating a configuration example of a learning device 400 of the present embodiment. The learning device 400 includes an acquisition portion 410 acquiring training data used for learning and a learning portion 420 performing machine learning based on the training data.

The acquisition portion 410 is, for example, a communication interface for acquiring the training data from another device. Alternatively, the acquisition portion 410 may acquire the training data stored in the learning device 400. For example, the learning device 400 includes a storage portion, not illustrated, and the acquisition portion 410 is an interface for reading the training data from the storage portion. Learning in the present embodiment is, for example, supervised learning. The training data in supervised learning is a data set in which input data is associated with an answer label.

The learning portion 420 generates a learned model by performing machine learning based on the training data acquired by the acquisition portion 410. The learning portion 420 of the present embodiment is configured with the following hardware. The hardware can include at least one of a circuit processing a digital signal and a circuit processing an analog signal. For example, the hardware can be configured with one or a plurality of circuit devices or one or a plurality of circuit elements packaged in a circuit substrate. One or the plurality of circuit devices are, for example, ICs. One or the plurality of circuit elements are, for example, resistors or capacitors.

The learning portion 420 may be implemented by the following processor. The learning device 400 of the present embodiment includes a memory storing information and the processor operating based on the information stored in the memory. The information includes, for example, a program and various data. The processor includes the hardware. Various processors such as a CPU, a graphics processing unit (GPU), and a digital signal processor (DSP) can be used as the processor. The memory may be a semiconductor memory such as a static random access memory (SRAM) or a dynamic random access memory (DRAM), a register, a magnetic storage device such as a hard disk device, or an optical storage device such as an optical disk device. For example, the memory stores a command readable by a computer. The function of each portion of the learning device 400 is implemented as processing by causing the processor to execute the command. The command here may be a command of a command set constituting the program or may be a command for instructing a hardware circuit of the processor to operate. For example, the memory stores the program prescribing a learning algorithm, and the processor executes learning processing by operating in accordance with the learning algorithm.

More specifically, the acquisition portion 410 acquires a data set in which the temperature information, the setting information, and countermeasure information are associated. The temperature information is information indicating at least one of the temperature of the usage environment of the printing apparatus 1 including the printing head 30 and the temperature of the nozzle plate NP of the printing head 30. The usage environment refers to an environment in which the printing apparatus 1 is used. The printing apparatus 1 is assumed to be used inside a room. Thus, in a narrow sense, the temperature in the usage environment is an atmospheric temperature measured inside the room. The setting information is information indicating setting at the time of ejecting ink to the printing medium by the printing head 30. The learning portion 420 performs machine learning of the countermeasure corresponding to the occurring situation of condensation based on the acquired data set.

According to a method of the present embodiment, machine learning is performed using the temperature information and the setting information which are information related to the occurring situation of condensation. As described above using FIGS. 5A to 5E and FIG. 6, an event causing a problem is clinging of a liquid droplet to the nozzle plate NP. However, observing the state of the nozzle plate NP is not easy during operation of the printing apparatus 1. Whether or not curved flight has occurred can be estimated using an ejection result image captured by the capturing portion 71. However, curved flight also occurs due to a factor other than condensation. Thus, estimating the occurring situation of condensation from only the ejection result image is difficult. Meanwhile, in the present embodiment, various information related to the occurring situation of condensation and the countermeasure information indicating an appropriate countermeasure corresponding to the occurring situation of condensation are used for machine learning. Thus, an appropriate countermeasure for suppressing and eliminating a failure such as curved flight caused by condensation can be accurately estimated using a learning result. For example, when an estimation of a situation in which condensation easily occurs is made, a countermeasure such as eliminating condensation by performing wiping or changing setting for preventing condensation from easily occurring can be performed.

The learning device 400 illustrated in FIG. 7 may be included in, for example, the printing apparatus 1 illustrated in FIG. 1. In this case, the learning portion 420 corresponds to the controller 100 of the printing apparatus 1. More specifically, the learning portion 420 may be the processor 102. The printing apparatus 1 accumulates the temperature information and the setting information in the memory 103. The acquisition portion 410 may be an interface for reading the temperature information and the setting information accumulated in the memory 103. The printing apparatus 1 may transmit the accumulated temperature information and setting information to an external apparatus such as the computer CP or a server system. The acquisition portion 410 may be the interface portion 101 for receiving the training data necessary for learning from the external apparatus. The countermeasure information is, for example, information manually input by the user. The user here is a user such as a developer or an experienced service technician of the printing apparatus 1 having knowledge about condensation.

The learning device 400 may be included in an apparatus different from the printing apparatus 1. For example, the learning device 400 may be included in an external apparatus connected to the printing apparatus 1 through a network. The network here may be a private network such as an intranet or may be a public communication network such as the Internet. The network may be either wired or wireless.

2.2 Neural Network

Figure 8:
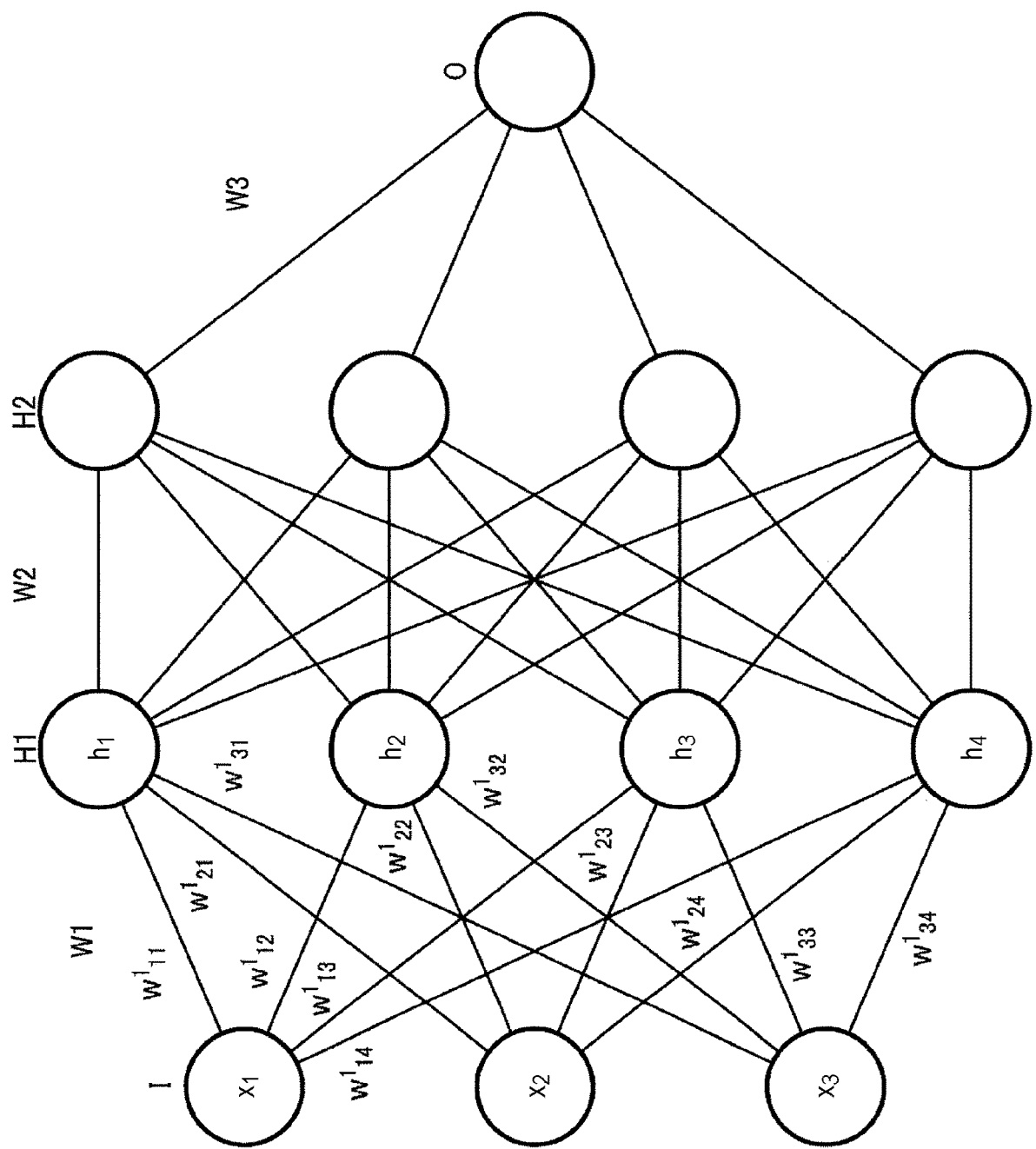
FIG. 8 is a descriptive diagram of a neural network.

Machine learning using a neural network will be described as a specific example of machine learning. FIG. 8 is a basic structure example of the neural network. The neural network is a mathematical model for simulating a brain function in a computer. One circle in FIG. 8 is called a node or a neuron. In the example in FIG. 8, the neural network includes an input layer, two intermediate layers, and an output layer. The input layer is denoted by I. The intermediate layers are denoted by H1 and H2. The output layer is denoted by O. In addition, in the example in FIG. 8, the number of neurons of the input layer is three. The number of neurons of each intermediate layer is four. The number of neurons of the output layer is one. Various modifications can be made to the number of layers of the intermediate layers and the number of neurons included in each layer. The neurons included in the input layer are connected to the neurons of H1 that is a first intermediate layer. The neurons included in the first intermediate layer are connected to the neurons of H2 that is a second intermediate layer. The neurons included in the second intermediate layer are connected to the neuron of the output layer. The intermediate layer may be referred to as a hidden layer.

The input layer includes each neuron outputting an input value. In the example in FIG. 8, the neural network receives $x_1$, $x_2$, and $x_3$ as input, and the neurons of the input layer output $x_1$, $x_2$, and $x_3$, respectively. Any preprocessing may be performed on the input value, and each neuron of the input layer may output the value after preprocessing.

In each neuron from the intermediate layers, calculation simulating a state where information is transmitted as an electric signal in a brain is performed. In the brain, the transmissibility of information is changed depending on connection strength between synapses. Thus, the connection strength is represented by a weight W in the neural network. W1 in FIG. 8 is a weight between the input layer and the first intermediate layer. W1 denotes a set of weights between a given neuron included in the input layer and a given neuron included in the first intermediate layer. When a weight between a p-th neuron of the input layer and a q-th neuron of the first intermediate layer is denoted by $w^1_{pq}$, W1 in FIG. 8 is information including 12 weights of $w^1_{11}$ to $w^1_{34}$. In a broader sense, the weight W1 is information including weights in number corresponding to the product of the number of neurons of the input layer and the number of neurons of the first intermediate layer.

In the first intermediate layer, calculation illustrated in Expression (1) below is performed in the first neuron. In one neuron, calculation of finding the sum of products of outputs of neurons of an immediately previous layer connected to the neuron and further adding a bias is performed. The bias in Expression (1) below is denoted by $b_1$.

As illustrated in Expression (1) above, an $$h_1 = f\left(\sum_i w^1_{i1} \cdot x_i + b_1\right) \quad (1)$$

activation function f that is a non-linear function is used in calculation in one neuron. For example, a ReLU function illustrated in Expression (2) below is used as the activation function f. The ReLU function is a function that outputs zero when a variable is less than or equal to zero, and outputs the value of the variable itself when the variable is greater than zero. It is known that various functions can be used as the activation function f. A sigmoid function may be used, or a function obtained by improving the ReLU function may be used. While a calculation expression with respect to hi is illustrated in Expression (1) above, the same calculation may be performed in the other neurons of the first intermediate layer.

$$f(x) = \max(0, x) = \begin{cases} 0 & (x \le 0) \\ x & (x \ge 0) \end{cases} \quad (2)$$

The same applies to the subsequent layers. For example, when a weight between the first intermediate layer and the second intermediate layer is denoted by W2, calculation of the sum of products using outputs of the first intermediate layer and the weight W2 and calculation of adding the bias and applying the activation function are performed in the neurons of the second intermediate layer. In the neuron of the output layer, calculation of weighting and adding outputs of the immediately previous layer and adding the bias is performed. In the example in FIG. 8, the immediately previous layer of the output layer is the second intermediate layer. In the neural network, a calculation result in the output layer is an output of the neural network.

As is perceived from the above description, it is necessary to set an appropriate weight and bias in order to obtain a desired output from an input. Hereinafter, the weight will also be referred to as the weighting coefficient. The bias may be included in the weighting coefficient. In learning, a data set in which a given input x is associated with a correct output for the input is prepared. The correct output is the answer label. The learning processing of the neural network can be considered as processing of obtaining the most probable weighting coefficient based on the data set. In the learning processing of the neural network, various learning methods such as backpropagation are known. These learning methods can be widely applied and thus, will not be described in detail in the present embodiment. The learning algorithm when the neural network is used is an algorithm of performing both of processing of acquiring a result in a forward direction by performing calculation such as Expression (1) above and processing of updating weighting coefficient information using backpropagation.

The neural network is not limited to the configuration illustrated in FIG. 8. For example, a widely-known convolutional neural network (CNN) may be used in the learning processing and inference processing, described later, of the present embodiment. The CNN includes a convolutional layer and a pooling layer. The convolutional layer performs convolution calculation. The convolution calculation here is specifically filter processing. The pooling layer performs processing of reducing the longitudinal and transverse sizes of data. In the CNN, characteristics of a filter used for the convolution calculation are learned by performing the learning processing using backpropagation or the like. That is, the characteristics of the filter in the CNN are included in the weighting coefficient in the neural network. The CNN is suitable when two-dimensional image data is used as information based on a nozzle plate image or ejection result image information.

An example in which the learned model is a model using the neural network is described above. However, machine learning in the present embodiment is not limited to a method using the neural network. For example, machine learning of various widely-known types such as a support vector machine (SVM) or machine learning of a type advanced from these types can be applied to the method of the present embodiment.

2.3 Example of Training Data and Details of Learning Processing

As described above, the temperature information and the setting information are considered as information related to occurrence of condensation. The temperature information is, for example, numerical value data in units of ° C. When both of the temperature of the nozzle plate NP and the temperature of the usage environment are used, the temperature information is a set of a plurality of pieces of numerical value data. Data in other forms may also be used as the temperature information.

As described above, the setting information includes at least one of distance information between the nozzle plate NP of the printing head 30 and the printing medium, the movement speed information about the carriage 21 to which the printing head 30 is mounted, and the heater temperature information about the heater 12 drying the printing medium.

The distance information between the nozzle plate NP and the printing medium is the print gap PG in a narrow sense. The print gap PG is numerical value data representing a distance. Alternatively, when the print gap PG is configured to be adjustable in stages, information from which a stage can be specified may be used as information indicating the print gap PG. The movement speed information may be information indicating the movement speed of the carriage 21 or may be the control information about the carriage motor. The heater temperature information may be information indicating a result of measuring a temperature in the vicinity of the heater 12 using a temperature sensor or may be control information from which a target temperature of the heater 12 can be specified. The temperature sensor here is a sensor different from a sensor measuring the temperature of the nozzle plate NP.

The movement speed information about the carriage 21 is used as information indicating the wind speed between the printing head 30 and the printing medium. Thus, when a fan is disposed in the printing apparatus 1, fan wind speed information indicating a wind speed of the fan may be included in the setting information. For example, the fan wind speed information is control information from which a drive amount of the fan can be specified. When the printing apparatus 1 of the line head type is used, the movement speed information is handled as, for example, zero.

The data set of the present embodiment includes the countermeasure information indicating which countermeasure is to be performed in a situation specified using given temperature information and setting information. For example, in a learning stage, the printing apparatus 1 performs processing of printing a sample image for training data collection and acquires and accumulates the temperature information and the setting information at the time of performing the processing. In addition, the state of the nozzle plate NP of the printing head 30 is sequentially checked. In order to check the state of the nozzle plate NP, for example, it is necessary to detach the printing head 30 or install a dedicated capturing unit. However, a purpose here is to generate the training data, and downtime or an increase in cost is not considered.

For example, it is considered that a liquid droplet does not cling to the nozzle plate NP before a given timing and clinging of a liquid droplet is checked at the given timing. In this case, it is estimated that the printing apparatus 1 is in a state where condensation easily occurs at the given timing and a predetermined period before the given timing. Thus, the training data is generated by associating the countermeasure information indicating execution of the countermeasure with the temperature information and the setting information acquired in the predetermined period. When a liquid droplet does not cling to the nozzle plate NP continuously for a predetermined period, it is estimated that the printing apparatus 1 is in a state where condensation does not easily occur in the predetermined period. Thus, the training data is generated by associating information indicating unnecessity of the countermeasure with the temperature information and the setting information acquired in the predetermined period. In the following description, the information indicating unnecessity of the countermeasure is also included in the countermeasure information.

When the countermeasure information indicating execution of the countermeasure is associated, a content of the countermeasure specified using the countermeasure information may be changed depending on the amount or position of the liquid droplet. For example, the countermeasure information is information for specifying any of a plurality of countermeasures including execution of wiping, changing of the setting information, and adjustment of the temperature or the humidity in the usage environment.

Execution of wiping means wiping the surface of the nozzle plate NP using the wiping unit 55. Condensation that has occurred at a timepoint of wiping can be eliminated by performing wiping. Thus, for example, when the amount of the liquid droplet is large or the position of the liquid droplet is close to the nozzle Nz, processing of including information indicating execution of wiping in the data set as the countermeasure information is performed.

Changing of the setting information includes any of a control for decreasing the temperature of the heater 12, a control for increasing the movement speed of the carriage 21, and a control for decreasing the print gap PG. These controls may be partially omitted. For example, when the movement speed of the carriage 21 is increased, control information about an ejection timing or the like of ink from the nozzle Nz also needs to be changed, and a processing load is high. In addition, the printing quality may be decreased. Thus, changing of the setting information may not include a control for changing the movement speed of the carriage 21.

Adjustment of the temperature or the humidity in the usage environment is a control for, for example, an air conditioner, an air purifier, a humidifier, or a dehumidifier disposed in the same space as the printing apparatus 1. The same space is, for example, the inside of the room in which the printing apparatus 1 is disposed. While condensation in the present embodiment is an event inside the printing apparatus 1, the printing apparatus 1 does not have an airtight casing and thus, is affected by outside air. Thus, it is possible to suppress a relative decrease in temperature of the nozzle plate NP by adjusting the temperature of outside air or decrease a humidity between the printing head 30 and the printing medium by adjusting the humidity of outside air. For example, the printing apparatus 1 and apparatuses such as the air conditioner are connected to a network, and the air conditioner and the like can be controlled from the printing apparatus 1 through the network.

Changing of the setting information or adjustment of the temperature or the humidity in the usage environment has a low degree of contribution to direct elimination of condensation compared to wiping. However, an environment inside and around the printing apparatus 1 can be set as an environment in which condensation does not easily occur. Thus, for example, when the amount of the liquid droplet is small or the position of the liquid droplet is far from the nozzle Nz, processing of including information indicating changing of the setting information or adjustment of the temperature or the humidity in the usage environment in the data set as the countermeasure information is performed.

The content of the countermeasure specified using the countermeasure information may be changed depending on a time-series change in amount or position of the liquid droplet. For example, when the amount of increase in liquid droplet is large, a likelihood that curved flight occurs in the future due to the liquid droplet is high. Thus, while the amount of the liquid droplet is small in this stage, processing of associating the countermeasure information indicating execution of wiping with the temperature information and the setting information at the timing is performed in order to prevent curved flight in advance.

The countermeasure specified using the countermeasure information may be a combination of a plurality of countermeasures. For example, the countermeasure information may be information for specifying a countermeasure of suppressing occurrence of condensation in the future by combining changing of the setting information while removing the currently clinging liquid droplet by performing wiping.

An example of operating the printing apparatus 1 for the purpose of generating the training data is described above. For example, the training data is acquired by operating the printing apparatus 1 before shipment for testing. However, the training data may be acquired from the printing apparatus 1 operating in an office, a factory, or the like after shipment. For example, a service for aggregating operation information about the printing apparatus 1 in the server system and causing the service technician to provide maintenance of the printing apparatus 1 based on the operation information is considered. The operation information here includes the temperature information and the setting information. When a determination that a factor of malfunction is condensation is made from the maintenance of the service technician, the determination and information about the countermeasure performed by the service technician are also stored in the server system. Even in this case, the data set in which the temperature information and the setting information are associated with the countermeasure information indicating a countermeasure appropriate for a situation specified using the temperature information and the setting information can be acquired.

Figure 9:
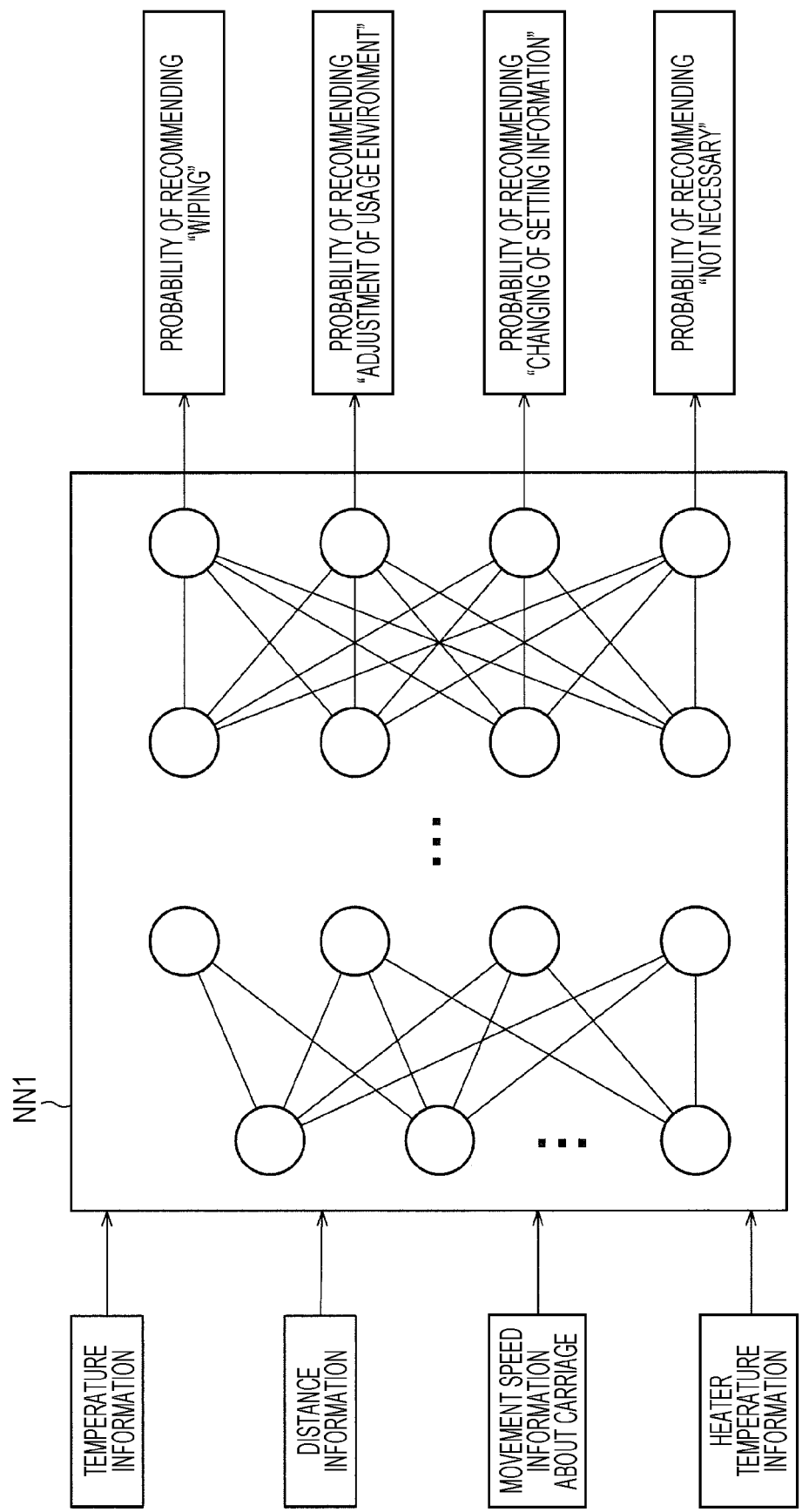
FIG. 9 is an example of an input and an output of the neural network.

FIG. 9 is one example illustrating the model of the neural network in the present embodiment. A neural network denoted by NN1 receives the temperature information and the setting information as input and outputs the countermeasure information indicating a recommended countermeasure as output data. In the example in FIG. 9, the countermeasure information indicating whether the recommended countermeasure is "wiping", "changing of the setting information", "adjustment of the usage environment", or "not necessary". The output layer of the neural network may be, for example, a widely-known softmax layer. In this case, the neural network has four outputs including probability data representing "wiping", probability data representing "changing of the setting information", probability data representing "adjustment of the usage environment", and probability data representing "not necessary".

For example, the learning processing based on the training data is performed in accordance with the following flow. First, the learning portion 420 inputs the input data into the neural network and acquires the output data by performing calculation in the forward direction using the weight at the time of input. In the present embodiment, the input data is the temperature information and the setting information. The output data obtained by calculation in the forward direction is the four probability data of which the total sum is one as described above.

The learning portion 420 calculates an error function based on the obtained output data and the answer label. For example, the answer label is information with which the value of the probability data corresponding to the recommended countermeasure is one and the values of the other three probability data are zero. For example, when the countermeasure to be recommended is "wiping", the specific answer label is information with which the value of the probability data representing "wiping" is one and the values of three probability data including the probability data representing "changing of the setting information", the probability data representing "adjustment of the usage environment", and the probability data representing "not necessary" are zero.

The learning portion 420 calculates dissimilarity between four probability data obtained by calculation in the forward direction and four probability data corresponding to the answer label as the error function and updates the weighting coefficient information in a direction of decreasing error. Various forms of error functions are known and can be widely applied in the present embodiment. While the weighting coefficient information is updated using, for example, backpropagation, other methods may be used.

Above is a summary of the learning processing based on one training data. The learning portion 420 learns appropriate weighting coefficient information by repeating the same processing for other training data. For example, the learning portion 420 sets a part of acquired data as the training data and sets the rest as test data. The test data may be referred to as the evaluation data or the verification data. The learning portion 420 performs learning by applying the test data to the learned model generated using the training data until an answer ratio becomes greater than or equal to a predetermined threshold.

The information included in the data set is not limited to the temperature information, the setting information, and the countermeasure information. For example, the data set may include humidity information in the usage environment. The humidity information is, for example, information detected by the humidity sensor 92 disposed in the printing apparatus 1. The humidity information may be numerical value data of greater than or equal to 0% and less than or equal to 100% or may be data in other forms from which a humidity can be specified. Alternatively, the acquisition portion 410 may acquire the humidity information from a humidity sensor disposed in the same space as the printing apparatus 1.

By doing so, machine learning considering the humidity of the usage environment can be performed. As described above, the humidity of the space as a target is strongly related to condensation. Thus, a learned model that can estimate a more appropriate countermeasure can be generated.

The data set may include the ejection result image information acquired by capturing the result of ejecting ink to the printing medium from the printing head 30. In a narrow sense, the ejection result image information corresponds to an output of the capturing unit 70. The ejection result image information may be the ejection result image which is the result of capturing, using the capturing portion 71, the printing medium on which an image is formed, or may be a result of image processing performed by the image processing portion 72. The image processing portion 72 determines, for example, whether or not curved flight has occurred and outputs a determination result as the ejection result image information.

The ejection result image information is information from which whether or not an ejection failure has occurred can be estimated. Machine learning considering whether or not an ejection failure has actually occurred can be performed using the ejection result image information. Thus, a learned model that can estimate an appropriate countermeasure can be generated. The factor of curved flight is not limited to condensation. For example, curved flight may also occur when mist has occurred, when a foreign object such as a piece of paper is mixed in the nozzle Nz, or when the print gap PG is excessively long. Thus, even when curved flight has occurred, it may not be said that condensation has occurred. However, considering that a result of condensation appears as curved flight when severe condensation having a large amount of the liquid droplet occurs, the ejection result image information is information related to condensation and can be used for machine learning.

The data set may include execution history information about a job performed by the printing apparatus 1. As described above, the temperature of the nozzle plate NP is increased by driving the piezo element PZT. Thus, as a large number of piezo elements PZT are driven with more frequency, the difference between the temperature of the nozzle plate NP and the temperature around the nozzle plate NP tends to be decreased. As the piezo element PZT is driven with less frequency, the difference in temperature tends to easily occur. The job here represents a set of data used when the printing apparatus 1 executes the printing processing once. Thus, a drive state of the piezo element PZT can be specified based on the execution history information about the job. The execution history information is information in a different viewpoint from the temperature information based on the temperature sensor 91. Thus, a learned model that can estimate a more appropriate countermeasure can be generated by performing machine learning using the execution history information.

The execution history information about the job used in machine learning may be information from which drive information about each nozzle Nz can be specified. Alternatively, simple information such as an execution timing or a duration of the job may be used in order to simplify processing. In addition, it is considered that the temperature of the nozzle plate NP is low while a power supply of the printing apparatus 1 is OFF, and is increased after the power supply is turned ON. Thus, information included in the data set may be elapsed time from when the power supply is turned ON.

The humidity information, the ejection result image information, the execution history information, and the like are used as, for example, inputs of the neural network. For example, the learning portion 420 performs the learning processing using the temperature information, the setting information, the humidity information, the ejection result image information, and the execution history information as input and using the countermeasure information as the answer label. A reception portion 210 of an information processing device 200 described later receives the temperature information, the setting information, the humidity information, the ejection result image information, and the execution history information. A processing portion 220 decides a countermeasure by inputting the received information into the learned model. Not all of the humidity information, the ejection result image information, and the execution history information need to be added, and any one of the information or any two of the information may be added. Other information may be added to the data set.

The data set may include information based on the nozzle plate image obtained by imaging the nozzle plate NP.

Figure 10:
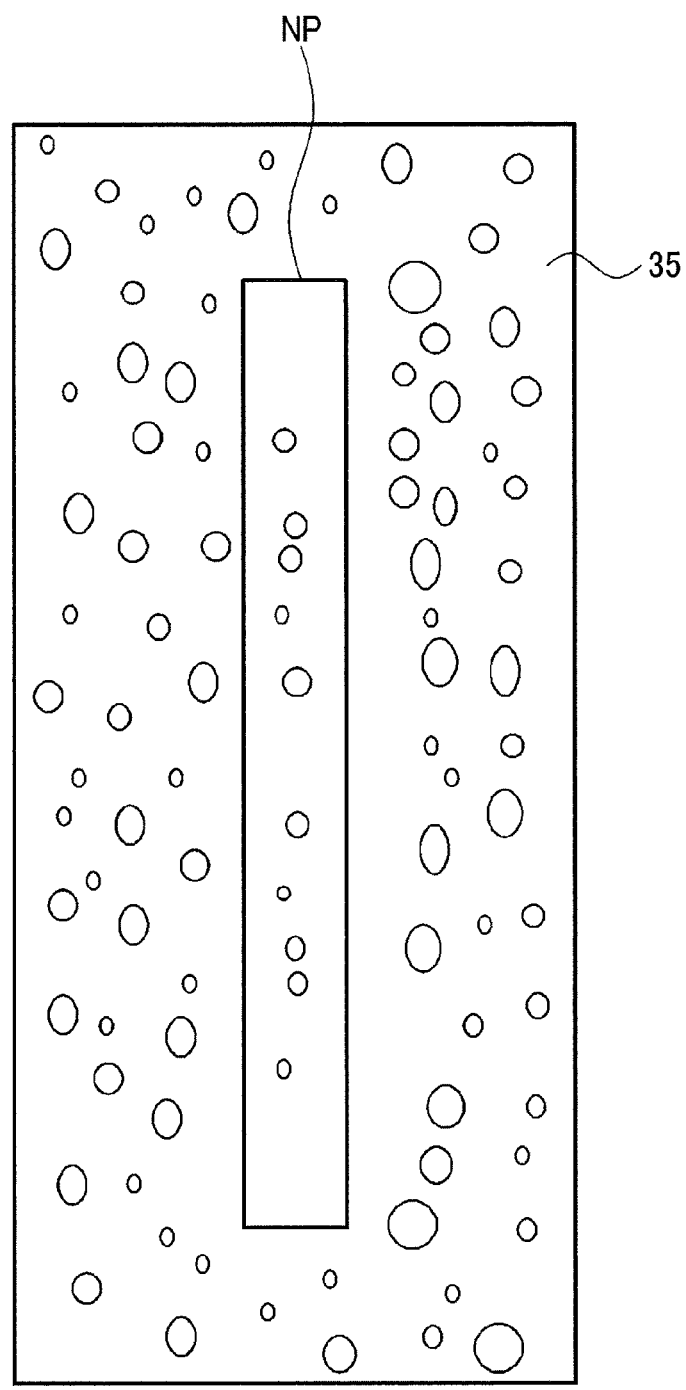
FIG. 10 is an example of a nozzle plate image.

FIG. 10 is an example of the nozzle plate image. For example, the nozzle plate image is an image obtained by capturing a region including the nozzle plate NP from the side from which ink is ejected. In the example in FIG. 10, the nozzle plate image is an image obtained by capturing the nozzle plate NP corresponding to a given head unit 31 and a part of the fixing plate 35 fixing the head unit 31. In addition, in the example in FIG. 10, liquid droplets are clinging to the nozzle plate NP and the fixing plate 35.

As described above, the user may manually input the countermeasure information by viewing the nozzle plate image. Alternatively, information based on the nozzle plate image may be directly used for machine learning. Information based on the nozzle plate image may be the nozzle plate image or information acquired by performing image processing on the nozzle plate image. For example, the position and size of a liquid droplet in the nozzle plate image can be easily specified by performing image processing of comparing the nozzle plate image as a processing target with the nozzle plate image captured in a state where condensation has not occurred. For example, information based on the nozzle plate image is severity of condensation calculated using the specified position and size of the liquid droplet. The severity is numerical value information that is increased as the amount of the liquid droplet is increased and the position of the liquid droplet is closer to the nozzle Nz. As the severity is increased, it is indicated that a likelihood that an ejection failure such as curved flight occurs is high when an appropriate countermeasure is not performed. The severity may be data in stages such as "high", "medium", and "low".

Figure 11:
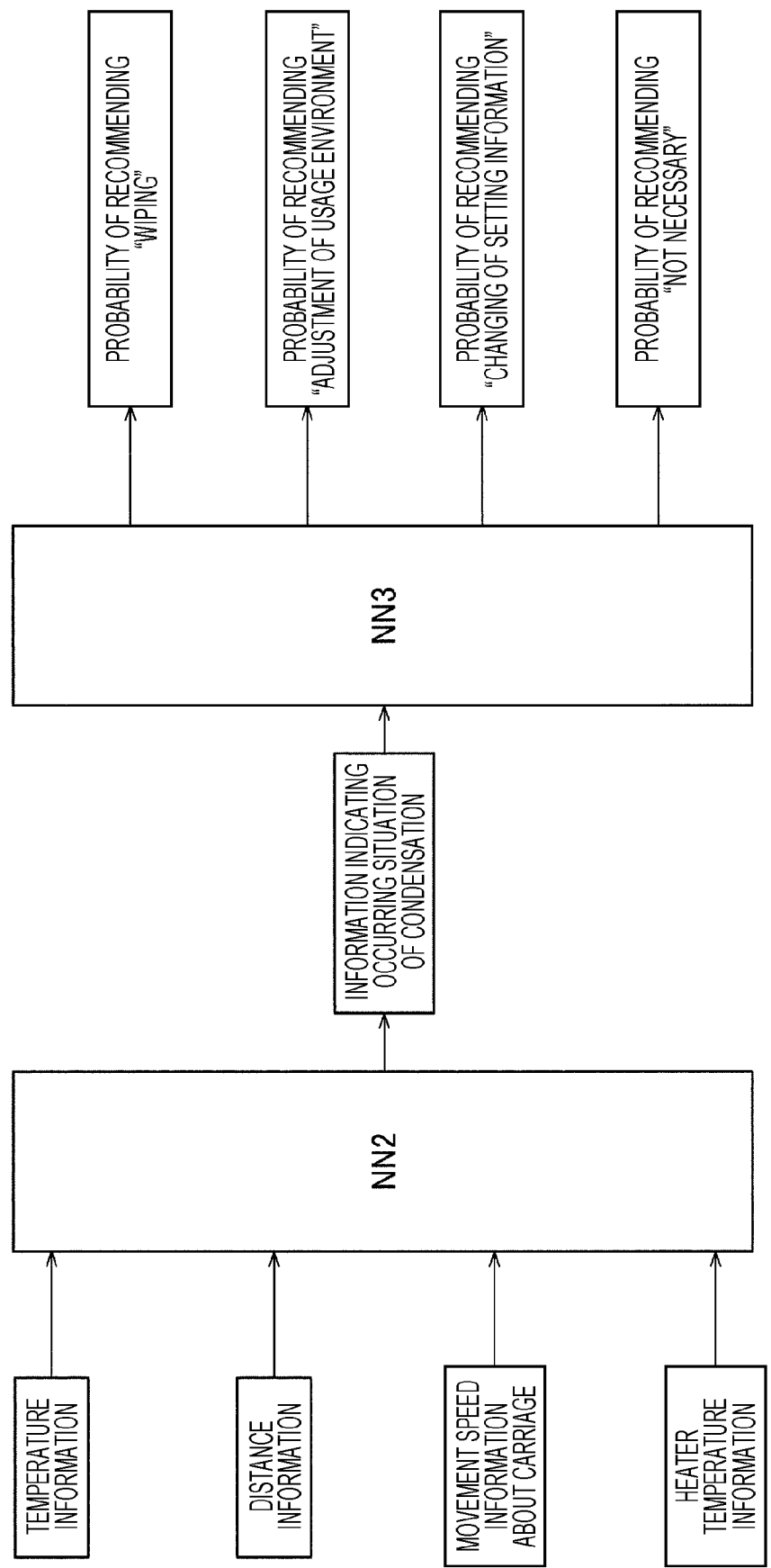
FIG. 11 is an example of the input and the output of the neural network.

FIG. 11 is one example illustrating the model of the neural network in the present embodiment. The neural network includes two neural networks NN2 and NN3. NN2 is a network that receives the temperature information and the setting information as input and outputs condensation information indicating the occurring situation of condensation. NN3 is a network that receives the condensation information as input and outputs the countermeasure information indicating the recommended countermeasure.

The learning portion 420 performs learning of NN2 and NN3 using information based on the nozzle plate image as the condensation information. The training data is a data set in which the temperature information, the setting information, the condensation information, and the countermeasure information are associated. The learning portion 420 learns the weighting coefficient of NN2 by performing the learning processing using the temperature information and the setting information as input and using the condensation information as the answer label. The learning portion 420 learns the weighting coefficient of NN3 by performing the learning processing using the condensation information as input and using the countermeasure information as the answer label.

Alternatively, the learning portion 420 may learn the weighting coefficient of NN2 by performing the learning processing using the temperature information and the setting information as input and using the condensation information as the answer label and learn the weighting coefficients of NN2 and NN3 by performing the learning processing using the temperature information and the setting information as input and using the countermeasure information as the answer label.

By doing so, processing considering the occurring situation of condensation at the moment can be performed. Specifically, as illustrated in FIG. 11, the weighting coefficient is learned such that a state in the intermediate layer of the neural network is approximated to a desired answer label. Thus, a learned model that can output more appropriate countermeasure information can be generated.

Figure 12:
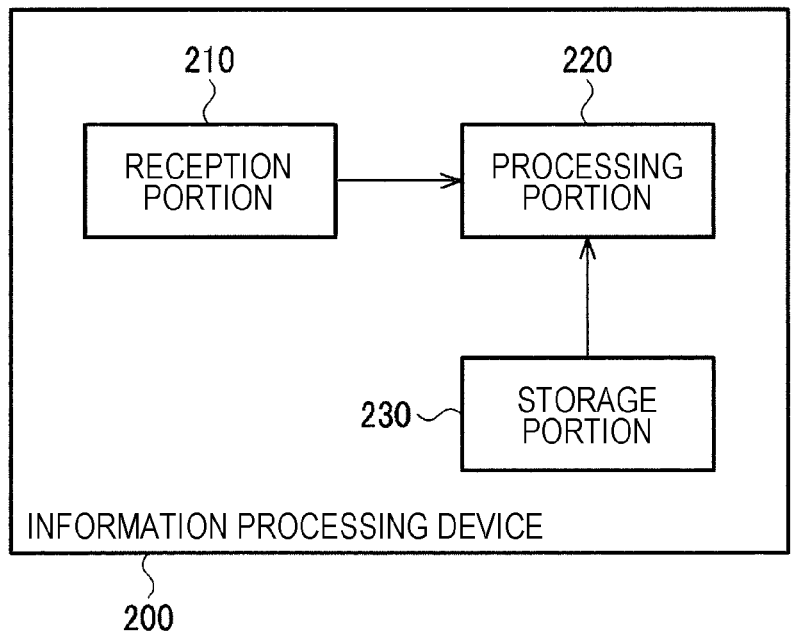
FIG. 12 is a configuration example of an information processing device.

3. Inference Processing 3.1 Configuration Example of Information Processing Device FIG. 12 is a diagram illustrating a configuration example of an inference device of the present embodiment. The inference device is the information processing device 200. The information processing device 200 includes the reception portion 210, the processing portion 220, and a storage portion 230.

The storage portion 230 stores the learned model trained by machine learning based on the data set in which the temperature information, the setting information, and the countermeasure information are associated. The reception portion 210 receives the temperature information and the setting information at the time of ejecting ink by the printing head 30 as input. The processing portion 220 decides the countermeasure recommended for condensation based on the temperature information and the setting information received as input and the learned model.

As described above, the temperature information and the setting information are information related to condensation. A countermeasure for suppressing a failure caused by condensation can be accurately estimated by inputting the temperature information and the setting information at the time of ejecting ink into the learned model trained by machine learning using the temperature information and the setting information.

The learned model is used as a program module that is a part of artificial intelligence software. The processing portion 220 outputs data representing a countermeasure corresponding to the temperature information and the setting information as input in accordance with an instruction from the learned model stored in the storage portion 230.

In the same manner as the learning portion 420 of the learning device 400, the processing portion 220 of the information processing device 200 is configured with hardware including at least one of a circuit processing a digital signal and a circuit processing an analog signal. The processing portion 220 may be implemented by the following processor. The information processing device 200 of the present embodiment includes a memory storing information and the processor operating based on the information stored in the memory. Various processors such as a CPU, a GPU, and a DSP can be used as the processor. The memory may be a semiconductor memory, a register, a magnetic storage device, or an optical storage device. The memory here is, for example, the storage portion 230. That is, the storage portion 230 is an information storage medium such as a semiconductor memory, and a program such as the learned model is stored in the information storage medium.

Calculation in the processing portion 220 in accordance with the learned model, that is, calculation for outputting the output data based on the input data, may be executed by software or may be executed by hardware. In other words, calculation of the sum of products such as Expression (1) above may be executed by software. Alternatively, the calculation may be executed by a circuit device such as a field-programmable gate array (FPGA). The calculation may be executed by a combination of software and hardware. Accordingly, the operation of the processing portion 220 in accordance with the instruction from the learned model stored in the storage portion 230 can be implemented in various aspects. For example, the learned model includes an inference algorithm and a parameter used in the inference algorithm. The inference algorithm is an algorithm of performing calculation of the sum of products such as Expression (1) above based on the input data. The parameter is a parameter acquired by the learning processing and is, for example, the weighting coefficient information. In this case, both of the inference algorithm and the parameter may be stored in the storage portion 230, and the processing portion 220 may perform the inference processing by software by reading the inference algorithm and the parameter. Alternatively, the inference algorithm may be implemented by an FPGA or the like, and the storage portion 230 may store the parameter.

The information processing device 200 illustrated in FIG. 12 is included in, for example, the printing apparatus 1 illustrated in FIG. 1. That is, the method of the present embodiment can be applied to the printing apparatus 1 including the information processing device 200. In this case, the processing portion 220 corresponds to the controller 100 of the printing apparatus 1 and corresponds to the processor 102 in a narrow sense. The storage portion 230 corresponds to the memory 103 of the printing apparatus 1. The reception portion 210 corresponds to the interface for reading the temperature information and the setting information accumulated in the memory 103. The printing apparatus 1 may transmit the accumulated operation information to an external apparatus such as the computer CP or the server system. The reception portion 210 may be the interface portion 101 receiving the temperature information and the setting information necessary for inference from the external apparatus. Alternatively, the information processing device 200 may be included in an apparatus different from the printing apparatus 1. For example, the information processing device 200 is included in an external apparatus such as the server system collecting the operation information from a plurality of printing apparatuses 1. The external apparatus performs processing of estimating the recommended countermeasure for each printing apparatus 1 based on the collected operation information and performs processing of transmitting information for providing an instruction to execute the countermeasure or information for notifying the countermeasure to the printing apparatuses 1.

Figure 13:
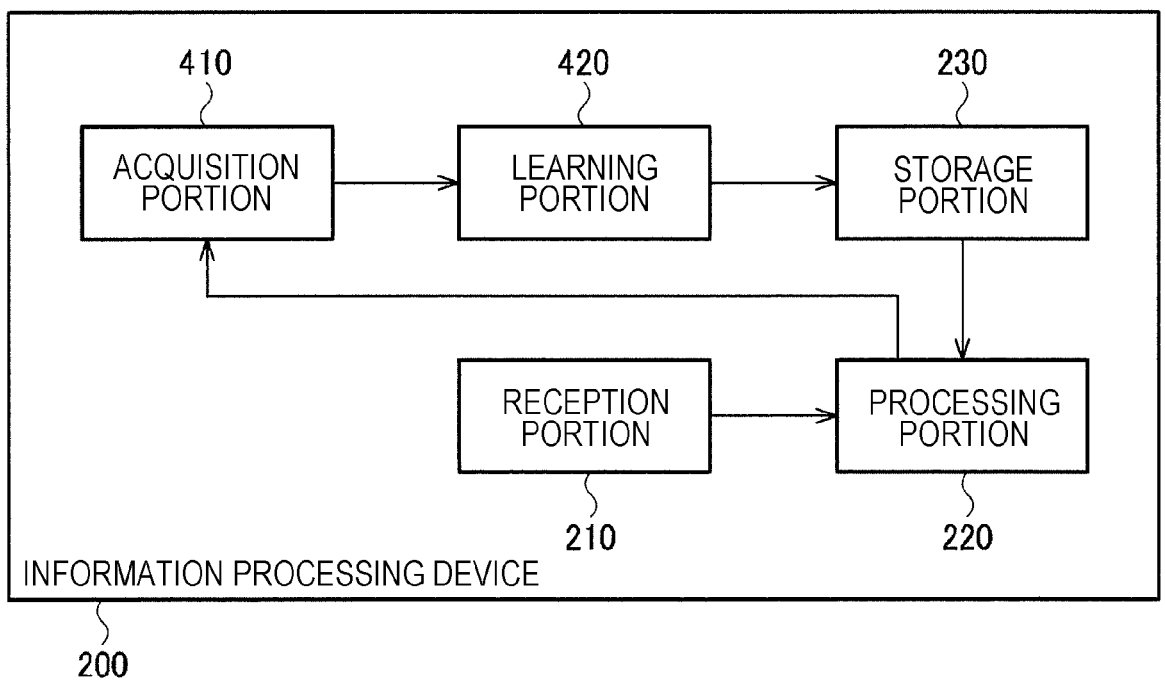
FIG. 13 is another configuration example of the information processing device.

The learning device 400 and the information processing device 200 are separately described above. However, the method of the present embodiment is not limited thereto. For example, as illustrated in FIG. 13, the information processing device 200 may include the acquisition portion 410 acquiring the data set in which the temperature information, the setting information, and the countermeasure information are associated, and the learning portion 420 performing machine learning of the countermeasure recommended for condensation based on the data set. In other words, the information processing device 200 includes a configuration corresponding to the learning device 400 illustrated in FIG. 7 in addition to the configuration in FIG. 12. By doing so, the learning processing and the inference processing can be efficiently executed in the same device.

The processing performed by the information processing device 200 of the present embodiment may be implemented as an information processing method. The information processing method is a method of acquiring the learned model, receiving the temperature information and the setting information at the time of ejecting ink by the printing head 30, and deciding the countermeasure to be executed for condensation based on the received temperature information and setting information and the learned model. As described above, the learned model here is a learned model trained by machine learning based on the data set in which the temperature information about at least one of the usage environment of the printing apparatus 1 and the nozzle plate NP of the printing head 30, the setting information at the time of ejecting ink to the printing medium by the printing head 30, and the countermeasure information indicating the countermeasure for condensation occurring in the nozzle plate NP are associated.

3.2 Flow of Inference Processing

Figure 14:
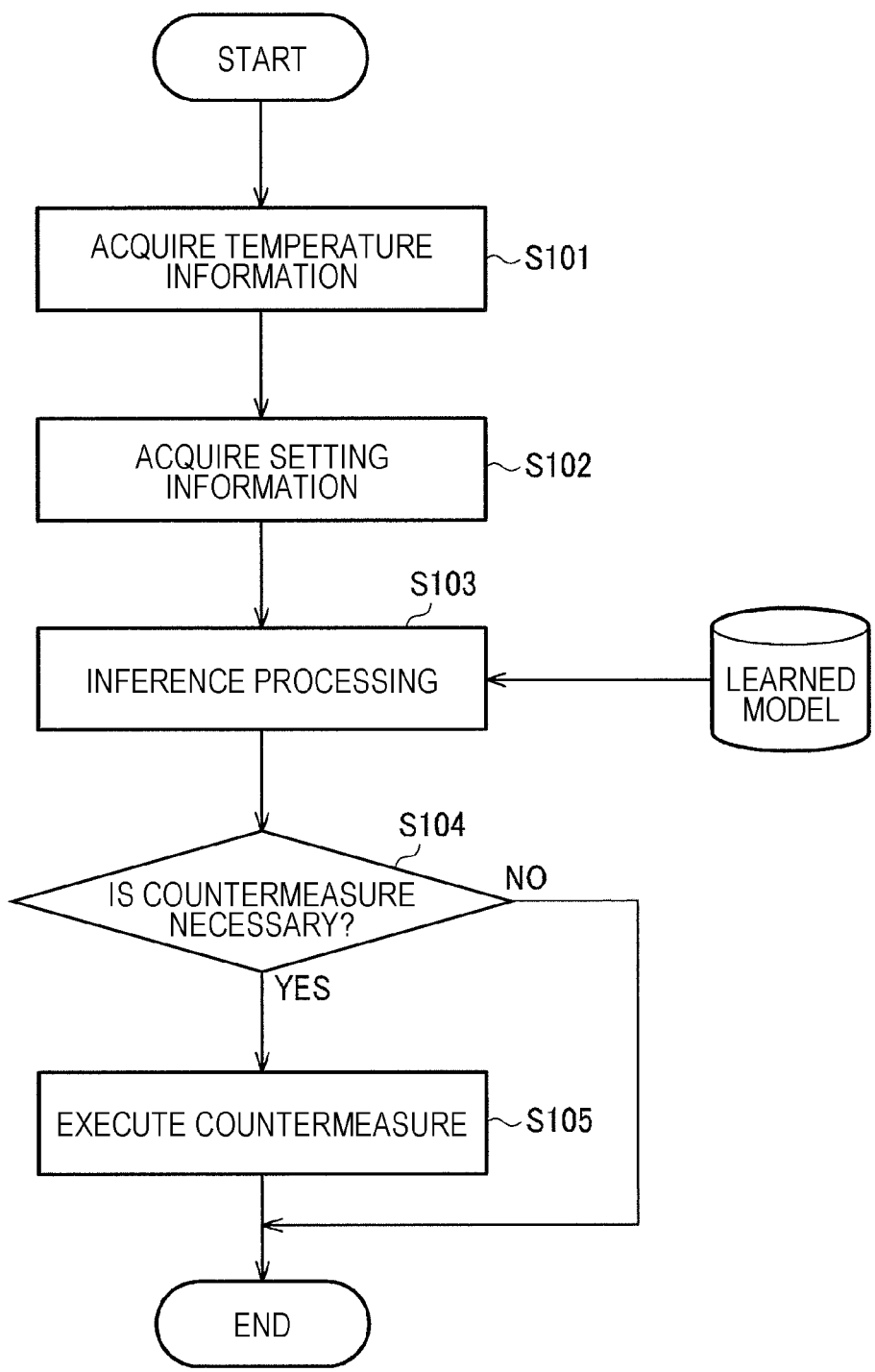
FIG. 14 is a flowchart for describing processing in the information processing device.

FIG. 14 is a flowchart for describing processing in the information processing device 200. When the processing is started, first, the reception portion 210 receives the temperature information and the setting information (S101 and S102).

At this point, the reception portion 210 receives, as input, the temperature information about the nozzle plate NP detected based on the temperature sensor 91 which is used for an ejection control of ink and is disposed in the printing head 30. For example, when the information processing device 200 corresponds to the printing apparatus 1, the information processing device 200 includes the printing head 30 and the temperature sensor 91 which is used for the ejection control of ink and is disposed in the printing head 30.

Operation characteristics of the piezo element PZT are changed depending on a temperature. Specifically, even when a voltage signal having the same waveform is applied to the piezo element PZT as a drive signal, the amount of ejected ink is changed depending on the temperature. Thus, temperature compensation processing of acquiring a temperature in the vicinity of the piezo element PZT and adjusting the waveform of the drive signal in accordance with the temperature is performed. In the method of the present embodiment, the temperature sensor 91 for compensating the temperature of the piezo element PZT can also be used for acquiring the temperature information about the nozzle plate NP. By doing so, the ejection control of ink and estimation processing for the countermeasure related to condensation can be executed with an efficient configuration.

An example in which the temperature sensor 91 disposed in the printing head 30 is used when the temperature information is acquired in the inference processing is described here. Alternatively, the temperature sensor 91 disposed in the printing head 30 may be used for acquiring the temperature information in the learning processing. That is, the temperature information included in the data set used for the learning processing may be detected by the temperature sensor 91 disposed in the printing head 30.

Next, the processing portion 220 performs processing of estimating the recommended countermeasure based on the acquired temperature information and setting information and the learned model stored in the storage portion 230 (S103). When the neural network illustrated in FIG. 9 or FIG. 11 is used, processing in S103 is processing of obtaining four probability data representing "wiping", "changing of the setting information", "adjustment of the usage environment", and "not necessary", respectively, and specifying the maximum value of the four probability data.

Next, the processing portion 220 determines whether or not the countermeasure is necessary (S104). When a determination of "not necessary" is made in S103, the processing portion 220 determines that the countermeasure is not necessary (No in S104) and finishes processing. In other cases, the processing portion 220 determines that the countermeasure is necessary (Yes in S104) and executes the specific countermeasure (S105). Specifically, in S105, the processing portion 220 executes any of processing of changing the setting information, processing of adjusting the temperature or the humidity in the usage environment, and wiping processing for the nozzle plate NP as the countermeasure.

For example, when the probability of "wiping" is the highest in S103, the processing portion 220 performs a control for causing the wiping unit 55 to perform wiping. When the probability of "changing of the setting information" is the highest in S103, the processing portion 220 performs processing including at least one of changing of the temperature of the heater, changing of the movement speed of the carriage 21, and changing of the print gap PG as the countermeasure. When the probability of "adjustment of the usage environment" is the highest in S103, the processing portion 220 performs processing of instructing the air conditioner or the like arranged in the same space as the printing apparatus 1 to change the temperature or the humidity. For example, the processing portion 220 transmits control information for instructing the air conditioner or the like to change the temperature by controlling a communication portion not illustrated. The control information may be directly transmitted to the air conditioner or the like from the printing apparatus 1 or may be transmitted through other apparatuses such as the server system.

Processing in S105 is not limited to automatic execution of the countermeasure and may be notification processing for prompting the user to execute the countermeasure. The notification processing here is processing of displaying a screen for presenting a content of the countermeasure or a screen for prompting the user to execute the countermeasure on a display portion, not illustrated, of the printing apparatus 1 or a display portion of the computer CP. The notification processing is not limited to displaying and may be processing of causing a light emission portion such as a light emitting diode (LED) to emit light or may be processing of outputting an alert sound or voice from a speaker. An apparatus performing the notification processing is not limited to the printing apparatus 1 or the computer CP and may be other apparatuses such as a portable terminal apparatus used by the user.

By doing so, when occurrence of condensation and occurrence of curved flight caused by the condensation are suspected, it is possible to execute an appropriate countermeasure or notify the user of the necessity of the countermeasure. Consequently, high-quality printing can be continuously executed.

An example of executing wiping is described above as one countermeasure. At this point, the processing portion 220 may perform the wiping processing after performing a control for wetting the nozzle plate NP. The control for wetting the nozzle plate NP may be a control for directly wetting the nozzle plate NP by causing the flushing unit 60 to perform flushing or may be a control for indirectly wetting the nozzle plate NP by wetting a member of the wiping unit 55 brought into contact with the nozzle plate NP. The member brought into contact with the nozzle plate NP is a wiping member such as a wiper or cloth. By doing so, wiping in a dry state is suppressed. Thus, damage to the printing head 30 can be suppressed. For example, water-repellent treatment on the surface of the nozzle plate NP can be protected.

The processing portion 220 may be capable of executing both of the countermeasure of executing wiping after performing the control for wetting the nozzle plate NP and the countermeasure of executing wiping without performing the control for wetting the nozzle plate NP. For example, when a determination that the amount of the liquid droplet clinging to the nozzle plate NP is greater than or equal to a predetermined amount is made, the control for wetting the nozzle plate NP before wiping is omitted. By doing so, appropriate wiping corresponding to a situation can be performed. Specifically, each of probability data for recommending the wiping processing accompanying the control for wetting and probability data for recommending the wiping processing not accompanying the control for wetting may be output as the output data of the neural network.

While the countermeasure of immediately executing wiping is illustrated above, the countermeasure in the present embodiment is not limited thereto. For example, when setting for periodically executing wiping at a given interval is made, the processing portion 220 may execute a countermeasure of adjusting the given interval. For example, when a determination that the printing apparatus 1 is in a situation in which condensation easily occurs is made, the processing portion 220 executes a countermeasure of decreasing the given interval.

4. Modification Example 4.1 Output of Learned Model

The learning processing of generating the learned model using the temperature information and the setting information as input and using the countermeasure information as output, and the inference processing using the learned model are described above. However, the method of the present embodiment is not limited thereto.

The acquisition portion 410 of the learning device 400 acquires a data set in which the temperature information, the setting information, and the condensation information indicating the occurring situation of condensation occurring in the nozzle plate NP are associated. The learning portion 420 performs machine learning of a relationship among the temperature information, the setting information, and the occurring situation of condensation based on the acquired data set.

The condensation information is information based on the nozzle plate image obtained by imaging the nozzle plate NP. By doing so, the state of the nozzle plate NP can be learned based on image information in a situation specified using the temperature information and the setting information. The condensation information may be information manually input by the user viewing the nozzle plate NP directly or through the capturing unit.

Figure 15:
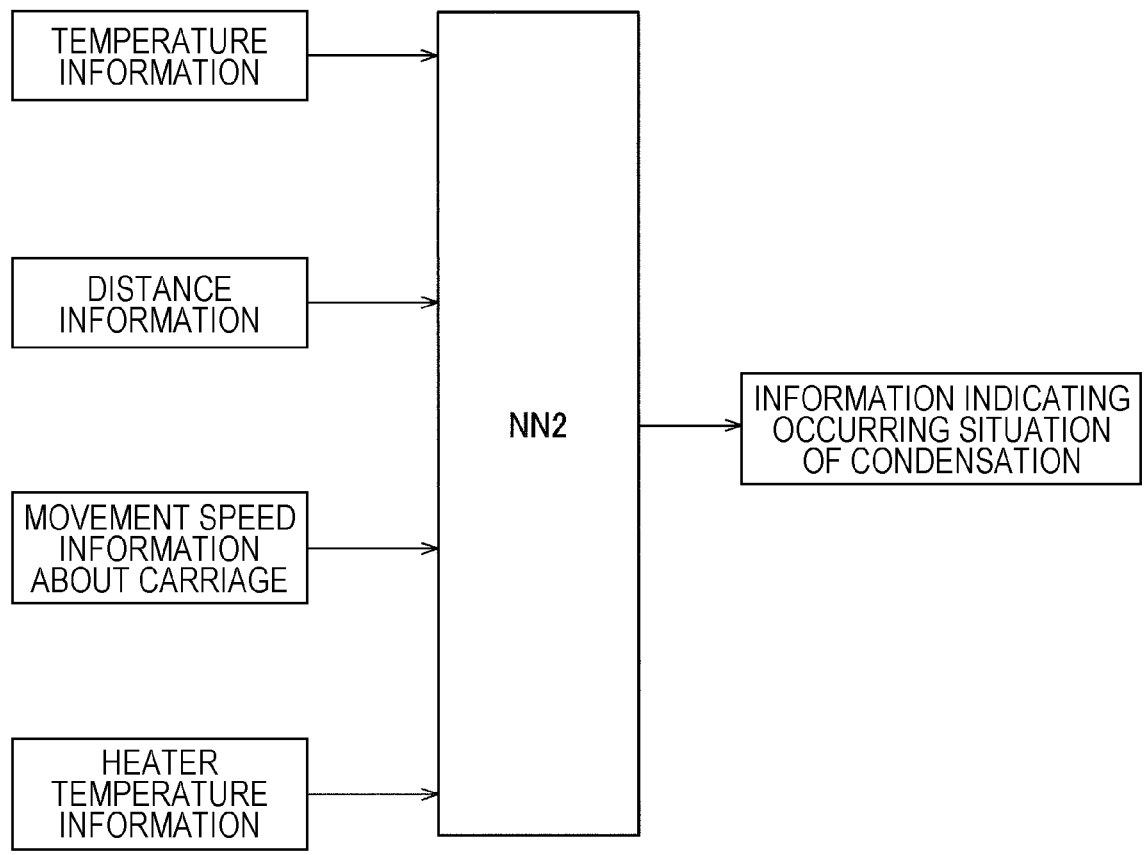
FIG. 15 is an example of the input and the output of the neural network.

FIG. 15 is one example illustrating the model of the neural network in the present embodiment. The neural network corresponds to NN2 in FIG. 11. NN2 is a network that receives the temperature information and the setting information as input and outputs the condensation information indicating the occurring situation of condensation.

The learning portion 420 performs learning of NN2 using information based on the nozzle plate image as the condensation information. The training data is a data set in which the temperature information, the setting information, and the condensation information are associated. The learning portion 420 learns the weighting coefficient of NN2 by performing the learning processing using the temperature information and the setting information as input and using the condensation information as the answer label.

The storage portion 230 of the information processing device 200 stores the learned model trained by machine learning based on the data set in which the temperature information, the setting information, and the condensation information are associated. The reception portion 210 receives the temperature information and the setting information at the time of ejecting ink by the printing head 30. The processing portion 220 estimates the occurring situation of condensation based on the received temperature information and setting information and the learned model.

By doing so, the occurring situation of condensation at the time of ejecting ink can be accurately estimated. When the condensation information is the nozzle plate image, an output of the learned model is image information indicating how the liquid droplet is clinging to the nozzle plate NP. When the condensation information is the severity of condensation, the output of the learned model is an estimated value of the current severity.

The processing performed by the information processing device 200 of the present embodiment may be implemented as an information processing method. The information processing method is a method of acquiring the learned model, receiving the temperature information and the setting information at the time of ejecting ink by the printing head 30, and estimating the occurring situation of condensation based on the received temperature information and setting information and the learned model. The learned model here is a learned model trained by machine learning based on the data set in which the temperature information about at least one of the usage environment of the printing apparatus 1 and the nozzle plate NP of the printing head 30, the setting information at the time of ejecting ink to the printing medium by the printing head 30, and the condensation information indicating the occurring situation of condensation occurring in the nozzle plate NP are associated.

Figure 16:
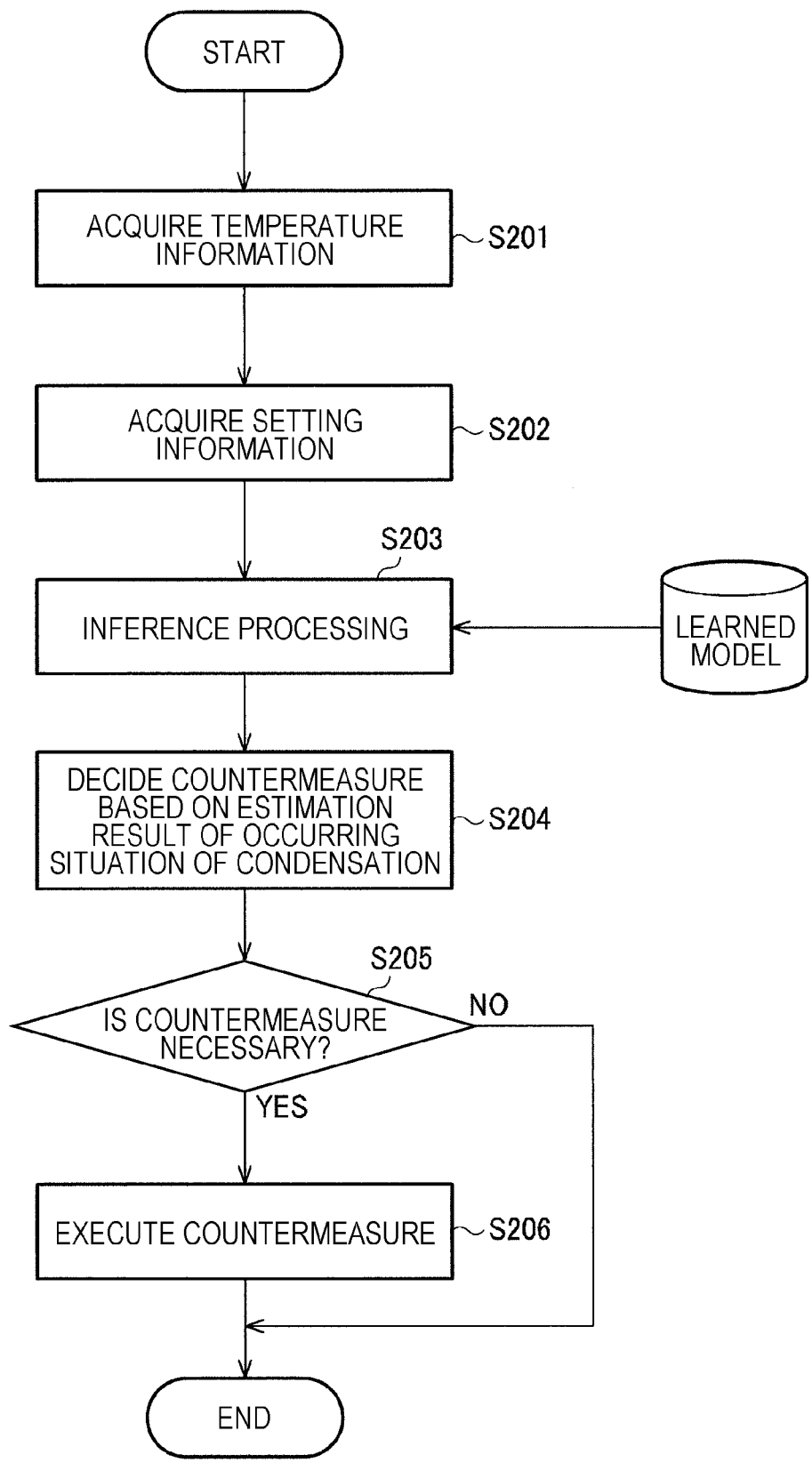
FIG. 16 is another flowchart for describing the processing in the information processing device.

FIG. 16 is a flowchart for describing processing in the information processing device 200. Processing in S201 and S202 is the same as S101 and S102 in FIG. 14. Next, the processing portion 220 performs the inference processing based on the acquired temperature information and setting information and the learned model stored in the storage portion 230 (S203). The inference processing in S203 is, for example, processing of obtaining the output of the neural network illustrated in FIG. 15. Thus, an output of the inference processing is information indicating the occurring situation of condensation.

The processing portion 220 decides the countermeasure to be executed for condensation based on an estimation result of the occurring situation of condensation (S204). For example, in the same manner as the example described above using FIG. 9, FIG. 11, and the like, the processing portion 220 performs processing of deciding any of the processing of changing the setting information, the processing of adjusting the temperature or the humidity in the usage environment, and the wiping processing for the nozzle plate NP as the countermeasure. For example, when the output is the image information, the processing portion 220 performs processing of determining the amount or position of the liquid droplet. When the output is the severity, processing of determining the magnitude of the severity is performed. For example, determination of the magnitude is processing of comparing with a given threshold. By doing so, an appropriate countermeasure corresponding to the occurring situation of condensation can be decided.

Next, the processing portion 220 determines whether or not the countermeasure is necessary (S205). When the countermeasure is not necessary (No in S205), the processing portion 220 finishes processing. When the countermeasure is necessary (Yes in S205), the processing portion 220 executes the specific countermeasure (S206). Processing in S206 may be the notification processing of notifying the countermeasure.

In S204, the processing portion 220 may not decide the specific countermeasure and may determine only the necessity of the countermeasure. In this case, processing in S206 is the notification processing of prompting the user to perform the countermeasure. That is, the user may be allowed to decide the content of the countermeasure.

The processing portion 220 may perform the notification processing of notifying the estimation result of the occurring situation of condensation instead of processing in S204 to S206. In this case, the user is allowed to not only decide the content of the countermeasure but also determine the necessity of the countermeasure.

4.2 Additional Learning

In the present embodiment, a learning stage and an inference stage may be clearly distinguished. For example, the learning processing is performed in advance by a maker or the like of the printing apparatus 1, and the learned model is stored in the memory 103 of the printing apparatus 1 at the time of shipment of the printing apparatus 1. In a stage of using the printing apparatus 1, the stored learned model is steadily used.

However, the method of the present embodiment is not limited thereto. The learning processing of the present embodiment may include initial learning of generating an initial learned model and additional learning of updating the learned model. The initial learned model is, for example, a general-purpose learned model stored in advance in the printing apparatus 1 before shipment as described above. The additional learning is, for example, learning processing for updating the learned model in accordance with a usage situation of individual users.

The additional learning may be executed in the learning device 400, and the learning device 400 may be a device different from the information processing device 200. The information processing device 200 performs processing of acquiring the temperature information and the setting information for the inference processing. The temperature information and the setting information can be used as a part of the training data in the additional learning. Considering this point, the additional learning may be performed in the information processing device 200. Specifically, the information processing device 200 includes the acquisition portion 410 and the learning portion 420 as illustrated in FIG. 13. The acquisition portion 410 acquires the temperature information and the setting information. For example, the acquisition portion 410 acquires information received by the reception portion 210 in S101 and S102 in FIG. 14. The learning portion 420 updates the learned model based on the data set in which the countermeasure information is associated with the temperature information and the setting information.

The countermeasure information here is, for example, information input by the user such as the service technician as described above. By doing so, the training data can be accumulated in the printing apparatus 1 in operation. Additional learning processing after acquisition of the training data is the same as the flow of learning processing described above and thus, will not be described in detail.

As described above, the information processing device of the present embodiment includes the storage portion storing the learned model, the reception portion receiving the temperature information and the setting information at the time of ejecting ink by the printing head, and the processing portion deciding the countermeasure to be executed for condensation based on the received temperature information and setting information and the learned model. The learned model is a learned model trained by machine learning based on the data set in which the temperature information, the setting information, and the countermeasure information are associated. The temperature information is information indicating the temperature of at least one of the usage environment of the printing apparatus including the printing head and the nozzle plate of the printing head. The setting information is information indicating setting at the time of ejecting ink to the printing medium by the printing head. The countermeasure information is information indicating the countermeasure for condensation occurring in the nozzle plate.

According to the method of the present embodiment, the countermeasure for condensation can be decided using the learned model. At this point, an appropriate countermeasure corresponding to a situation can be estimated using the learned model trained by machine learning based on the data set including the temperature information and the setting information related to the occurring situation of condensation.

The setting information may include at least one of the distance information between the nozzle plate of the printing head and the printing medium, the movement speed information about the carriage to which the printing head is mounted, and the heater temperature information about the heater drying the printing medium.

An appropriate countermeasure corresponding to a situation can be estimated using information related to the occurring situation of condensation as the setting information.

The data set may include information based on the nozzle plate image obtained by imaging the nozzle plate.

By doing so, processing considering the occurring situation of condensation can be performed. Thus, an appropriate countermeasure corresponding to a situation can be estimated.

The data set may include the humidity information in the usage environment.

An appropriate countermeasure corresponding to a situation can be estimated by including information related to the occurring situation of condensation in the data set.

The data set may include the ejection result image information acquired by capturing the result of ejecting ink to the printing medium from the printing head.

An appropriate countermeasure corresponding to a situation can be estimated by including information related to the occurring situation of condensation in the data set.

The processing portion may execute any of the processing of changing the setting information, the processing of adjusting the temperature or the humidity in the usage environment, and the wiping processing for the nozzle plate as the countermeasure.

By doing so, a countermeasure implementing an environment in which condensation does not easily occur, or a countermeasure eliminating condensation that has occurred can be executed.

The processing portion may perform the wiping processing after performing the control for wetting the nozzle plate as the countermeasure.

By doing so, damage to the printing head caused by wiping can be suppressed.

The information processing device of the present embodiment may include the printing head and the temperature sensor which is used for the ejection control of ink and is disposed in the printing head. The reception portion receives the temperature information about the nozzle plate detected based on the temperature sensor.

By doing so, the temperature sensor used for the ejection control of ink can also be used for processing of deciding the countermeasure for condensation.

The information processing device of the present embodiment includes the storage portion storing the learned model, the reception portion receiving the temperature information and the setting information at the time of ejecting ink by the printing head, and the processing portion estimating the occurring situation of condensation based on the received temperature information and setting information and the learned model. The learned model is a learned model trained by machine learning based on the data set in which the temperature information, the setting information, and the condensation information indicating the occurring situation of condensation occurring in the nozzle plate are associated.

According to the method of the present embodiment, the occurring situation of condensation can be estimated using the learned model. At this point, highly accurate estimation processing can be performed using the learned model trained by machine learning based on the data set including the temperature information and the setting information related to the occurring situation of condensation.

The processing portion may decide the countermeasure to be executed for condensation based on the estimation result of the occurring situation of condensation.

By doing so, an appropriate countermeasure corresponding to the estimated occurring situation of condensation can be decided.

The processing portion may execute any of the processing of changing the setting information, the processing of adjusting the temperature or the humidity in the usage environment, and the wiping processing for the nozzle plate as the countermeasure.

By doing so, a countermeasure implementing an environment in which condensation does not easily occur, or a countermeasure eliminating condensation that has occurred can be executed.

The condensation information may be information based on the nozzle plate image obtained by imaging the nozzle plate.

By doing so, information on which the occurring situation of condensation is reflected can be used for machine learning. Thus, estimation accuracy can be increased.

The learning device of the present embodiment includes the acquisition portion acquiring the data set in which the temperature information, the setting information, and the countermeasure information are associated, and the learning portion performing machine learning of the countermeasure corresponding to the occurring situation of condensation based on the acquired data set.

According to the method of the present embodiment, a learning result from which a countermeasure considered appropriate can be estimated can be output in a situation specified using the temperature information and the setting information.

The learning device of the present embodiment includes the acquisition portion acquiring the data set in which the temperature information, the setting information, and the condensation information indicating the occurring situation of condensation occurring in the nozzle plate are associated, and the learning portion performing machine learning of a relationship among the temperature information, the setting information, and the occurring situation of condensation based on the acquired data set.

According to the method of the present embodiment, a learning result from which the occurring situation of condensation in a situation specified using the temperature information and the setting information can be accurately estimated can be output.

The information processing method of the present embodiment includes acquiring the learned model, receiving the temperature information and the setting information at the time of ejecting ink by the printing head, and deciding the countermeasure to be executed for condensation based on the received temperature information and setting information and the learned model. The learned model is trained by machine learning based on the data set in which the temperature information about at least one of the usage environment of the printing apparatus including the printing head and the nozzle plate of the printing head, the setting information at the time of ejecting ink to the printing medium by the printing head, and the countermeasure information indicating the countermeasure for condensation occurring in the nozzle plate are associated.

The information processing method of the present embodiment includes acquiring the learned model, receiving the temperature information and the setting information at the time of ejecting ink by the printing head, and estimating the occurring situation of condensation based on the received temperature information and setting information and the learned model. The learned model is trained by machine learning based on the data set in which the temperature information about at least one of the usage environment of the printing apparatus including the printing head and the nozzle plate of the printing head, the setting information at the time of ejecting ink to the printing medium by the printing head, and the condensation information indicating the occurring situation of condensation occurring in the nozzle plate are associated.

While the present embodiment is described in detail above, those skilled in the art may easily perceive that various modifications can be made without substantially departing from the novelty and the effects of the present embodiment. Accordingly, all of such modification examples fall within the scope of the present disclosure. For example, terms described in the specification or the drawings at least once together with different terms in a broader sense or the same sense can be replaced with the different terms in any part of the specification or the drawings. All combinations of the present embodiment and the modification examples also fall within the scope of the present disclosure. The configurations, operation, and the like of the learning device, the information processing device, and a system including those devices are not limited to the description of the present embodiment and can be subjected to various modifications.

What is claimed is:

1. An information processing device comprising:
   a storage portion storing a learned model trained by machine learning based on a data set in which temperature information about at least one of a usage environment of a printing apparatus including a printing head and a nozzle plate of the printing head, setting information at a time of ejecting ink to a printing medium by the printing head, and countermeasure information indicating a countermeasure for condensation occurring in the nozzle plate are associated;
   a reception portion receiving the temperature information and the setting information at the time of ejecting the ink by the printing head; and
   a processing portion deciding the countermeasure to be executed for the condensation based on the received temperature information and setting information and the learned model,
   wherein the setting information includes heater temperature information about a heater drying the printing medium, or
   wherein the data set includes information based on a nozzle plate image obtained by imaging the nozzle plate.

2. The information processing device according to claim 1, wherein the data set includes humidity information in the usage environment.

3. The information processing device according to claim 1, wherein the data set includes ejection result image information acquired by capturing a result of ejecting the ink to the printing medium from the printing head.

4. The information processing device according to claim 1, wherein the processing portion executes any of processing of changing the setting information, processing of adjusting a temperature or a humidity in the usage environment, and wiping processing for the nozzle plate as the countermeasure.

5. The information processing device according to claim 4, wherein the processing portion performs the wiping processing after performing a control for wetting the nozzle plate as the countermeasure.

6. The information processing device according to claim 1, further comprising:
   the printing head; and
   a temperature sensor that is used for ejection control of the ink and is disposed in the printing head, wherein
   the reception portion receives the temperature information about the nozzle plate detected based on the temperature sensor.

7. An information processing device comprising:
   a storage portion storing a learned model trained by machine learning based on a data set in which temperature information about at least one of a usage environment of a printing apparatus including a printing head and a nozzle plate of the printing head, setting information at a time of ejecting ink to a printing medium by the printing head, and condensation information indicating an occurring situation of condensation occurring in the nozzle plate are associated;
   a reception portion receiving the temperature information and the setting information at the time of ejecting the ink by the printing head; and
   a processing portion estimating the occurring situation of the condensation based on the received temperature information and setting information and the learned model, wherein the setting information includes heater temperature information about a heater drying the printing medium, or wherein the data set includes information based on a nozzle plate image obtained by imaging the nozzle plate.

8. The information processing device according to claim 7, wherein the processing portion decides a countermeasure to be executed for the condensation based on an estimation result of the occurring situation of the condensation.

9. The information processing device according to claim 8, wherein the processing portion executes any of processing of changing the setting information, processing of adjusting a temperature or a humidity in the usage environment, and wiping processing for the nozzle plate as the countermeasure.

10. The information processing device according to claim 7, wherein the condensation information is information based on a nozzle plate image obtained by imaging the nozzle plate.

11. An information processing method comprising:

acquiring a learned model trained by machine learning based on a data set in which temperature information about at least one of a usage environment of a printing apparatus including a printing head and a nozzle plate of the printing head, setting information at a time of ejecting ink to a printing medium by the printing head, and countermeasure information indicating a countermeasure for condensation occurring in the nozzle plate are associated;

receiving the temperature information and the setting information at the time of ejecting the ink by the printing head; and deciding the countermeasure to be executed for the condensation based on the received temperature information and setting information and the learned model, wherein the setting information includes heater temperature information about a heater drying the printing medium, or wherein the data set includes information based on a nozzle plate image obtained by imaging the nozzle plate.

* * * * *